US007016325B2

(12) United States Patent
Beasley et al.

(10) Patent No.: US 7,016,325 B2
(45) Date of Patent: Mar. 21, 2006

(54) LINK CONTEXT MOBILITY METHOD AND SYSTEM FOR PROVIDING SUCH MOBILITY, SUCH AS A SYSTEM EMPLOYING SHORT RANGE FREQUENCY HOPPING SPREAD SPECTRUM WIRELESS PROTOCOLS

(75) Inventors: James Beasley, Simi Valley, CA (US); Dennis Dombrowski, Moorpark, CA (US); James Fuhring, Ventura, CA (US); James Jollota, Simi Valley, CA (US); Duke Kamstra, Thousand Oaks, CA (US); Matthew Kuiken, Thousand Oaks, CA (US); Wade Mergenthal, Camarillo, CA (US); Soiba Mohammad, Winnetka, CA (US); Carol Sherick, Camarillo, CA (US); Spencer Stephens, Los Angeles, CA (US); Alan White, Ventura, CA (US); Said Zandian, Oak Park, CA (US)

(73) Assignee: Strix Systems, Inc., Westlake Village, CA (US)

( * ) Notice: Subject to any disclaimer, the term of this patent is extended or adjusted under 35 U.S.C. 154(b) by 851 days.

(21) Appl. No.: 10/052,910

(22) Filed: Jan. 18, 2002

(65) Prior Publication Data

US 2002/0167965 A1 Nov. 14, 2002

Related U.S. Application Data

(60) Provisional application No. 60/333,885, filed on Nov. 28, 2001, provisional application No. 60/288,294, filed on May 2, 2001, provisional application No. 60/262,558, filed on Jan. 18, 2001.

(51) Int. Cl.
*H04Q 7/00* (2006.01)
*H04L 12/28* (2006.01)
*H04J 3/16* (2006.01)

(52) U.S. Cl. ...................... 370/331; 370/401; 370/469; 455/41.2
(58) Field of Classification Search ................ 370/331, 370/328, 252, 338, 401, 469, 389; 455/41.2, 455/436
See application file for complete search history.

(56) References Cited

U.S. PATENT DOCUMENTS

| 3,781,803 | A | 12/1973 | Shear et al. |
|---|---|---|---|
| 5,068,916 | A | 11/1991 | Harrison et al. |
| 5,179,569 | A | 1/1993 | Sawyer |
| 5,329,635 | A | 7/1994 | Wadin et al. |
| 5,408,506 | A | 4/1995 | Mincher et al. |
| 5,495,508 | A | 2/1996 | Kaewell, Jr. et al. |
| 5,537,685 | A | 7/1996 | Matsuno |
| 5,542,098 | A | 7/1996 | Bonta |
| 5,577,025 | A | 11/1996 | Skinner et al. |
| 5,608,780 | A | 3/1997 | Gerszberg et al. |
| 5,613,211 | A | 3/1997 | Matsuno |
| 5,625,653 | A | 4/1997 | Kaewell, Jr. et al. |
| 5,794,149 | A | 8/1998 | Hoo |
| 5,818,814 | A | 10/1998 | Testani et al. |
| 5,854,981 | A | 12/1998 | Wallstedt et al. |
| 5,875,179 | A | 2/1999 | Tikalsky |
| 5,875,402 | A | 2/1999 | Yamawaki |
| 5,887,022 | A | 3/1999 | Lee et al. |
| 5,898,929 | A | 4/1999 | Haartsen |
| 5,907,807 | A | 5/1999 | Chavez, Jr. et al. |
| 5,920,549 | A | 7/1999 | Bruckert et al. |
| 5,930,297 | A | 7/1999 | Kaewell, Jr. et al. |
| 5,960,344 | A | 9/1999 | Mahany |
| 6,018,667 | A | 1/2000 | Ghosh et al. |
| 6,026,297 | A | 2/2000 | Haartsen |
| 6,046,824 | A | 4/2000 | Barak |
| 6,078,571 | A | 6/2000 | Hall |
| 6,091,936 | A | 7/2000 | Chennakeshu et al. |
| 6,097,703 | A | 8/2000 | Larsen et al. |
| 6,112,100 | A | 8/2000 | Ossoinig et al. |
| 6,119,005 | A | 9/2000 | Smolik |
| 6,119,016 | A | 9/2000 | Matusevich |
| 6,125,138 | A | 9/2000 | Kumagai |
| 6,125,280 | A | 9/2000 | Grandhi et al. |
| 6,151,502 | A | 11/2000 | Padovani et al. |
| 6,175,860 | B1 | 1/2001 | Gaucher |

| | | | |
|---|---|---|---|
| 6,178,164 B1 | 1/2001 | Wang et al. | |
| 6,185,429 B1 | 2/2001 | Gehrke et al. | |
| 6,188,904 B1 | 2/2001 | Marsan | |
| 6,192,244 B1 | 2/2001 | Abbadessa | |
| 6,195,342 B1 | 2/2001 | Rohani | |
| 6,195,551 B1 | 2/2001 | Kim et al. | |
| 6,198,920 B1 | 3/2001 | Doviak et al. | |
| 6,201,962 B1 | 3/2001 | Sturniolo et al. | |
| 6,201,969 B1 | 3/2001 | Meier | |
| 6,212,398 B1 | 4/2001 | Roberts et al. | |
| 6,219,347 B1 | 4/2001 | Uchida et al. | |
| 6,223,040 B1 | 4/2001 | Dam | |
| 6,226,515 B1 | 5/2001 | Pauli et al. | |
| 6,430,395 B1 | 8/2002 | Arazi et al. | |
| 6,633,761 B1 * | 10/2003 | Singhal et al. | 455/436 |
| 6,775,258 B1 * | 8/2004 | van Valkenburg et al. | 370/338 |
| 6,826,387 B1 * | 11/2004 | Kammer | 455/41.2 |
| 6,885,847 B1 * | 4/2005 | Lumelsky | 455/41.2 |
| 2002/0035699 A1 | 3/2002 | Crosbie | |
| 2002/0044549 A1 * | 4/2002 | Johansson et al. | 370/386 |
| 2002/0075941 A1 | 6/2002 | Souissi et al. | |
| 2002/0085719 A1 | 7/2002 | Crosbie | |
| 2002/0114303 A1 * | 8/2002 | Crosbie et al. | 370/338 |

FOREIGN PATENT DOCUMENTS

| | | |
|---|---|---|
| EP | 0 639 036 A2 | 2/1995 |
| EP | 1071305 A2 | 1/2001 |
| WO | WO 97/32445 A1 | 9/1997 |
| WO | WO 98/39936 A2 | 9/1998 |
| WO | WO 98/56140 A2 | 12/1998 |
| WO | WO 99/07105 A2 | 2/1999 |
| WO | WO 00/27142 A1 | 5/2000 |
| WO | WO 00/69186 A1 | 11/2000 |
| WO | WO 01/01717 A1 | 1/2001 |
| WO | WO 01/03327 A2 | 1/2001 |
| WO | WO 01/03370 A2 | 1/2001 |
| WO | WO 01/03371 A2 | 1/2001 |
| WO | WO 01/41348 A2 | 6/2001 |
| WO | WO 01/78246 A1 | 10/2001 |
| WO | WO 02/03626 A2 | 1/2002 |
| WO | WO 02/25838 A1 | 3/2002 |
| WO | WO 02/25967 A1 | 3/2002 |
| WO | WO 02/41587 A2 | 5/2002 |

OTHER PUBLICATIONS

Corson et al., Temporally-Ordered Routing Algorithm (TORA) Version 1 Functional Specification (Internal Draft, Nov. 15, 1997 pp. 1-20) http://www.ics.uci.edu/~atm/adhoc/paper-collection/corson-draft-ieft-manet-tora-spec-00.txt (Nov. 4, 2002), University of California, Irvine.

Schiller, J., "Mobile Communications," pp 84-112, Addison-Wesley, 2000.

U.S. Appl. No. 10/139,130, filed May 2, 2002, Beasley et al.

U.S. Appl. No. 10/139,609, filed May 2, 2002, Beasley et al.

Alvarion Ltd., "Alvarion Products," http://www.alvarion.com/RunTime/Products$_{13}$2000.asp?fuf=1&PrintVersion=1 (Nov. 19, 2002), 1 page, Tel Aviv, Israel.

Alvarion Ltd., "BreezeLINK Full Duplex Wireless E1/T1 Modem. Extending your reach," http://www.alvarion.com/RunTime/Materials/PDFFiles/breezelink$_{13}$brochure.pdf (Nov. 5, 2002), 2 pages, Tel Aviv, Israel, 2001.

Alvarion Ltd., "BreezeLINK " http://www.alvarion.com/RunTime/Products$_{13}$2015.asp?tNodeParam=19&fuf=1&PrintVersion=1 (Nov. 5, 2002), 2 pages, Tel Aviv, Israel.

Alvarion Ltd., "BreezeNET PRO.11 Indoor," http://www.alvarion.com/RunTime/Products$_{13}$2020.asp?tNodeParam=14&fuf=1&PrintVersion=1 (Nov. 5, 2002), 2 pages, Tel Aviv, Israel.

Alvarion Ltd., "BreezeNET PRO.11 Outdoor," http://www.alvarion.com/RunTime/Products$_{13}$2020.asp?tNodeParam=13&fuf=1&PrintVersion=1 (Nov. 5, 2002), 2 pages, Tel Aviv, Israel.

Alvarion Ltd., "BreezeNET PRO.11 Wireless LAN. Hopping the Spectrum," http://www.alvarion.com/RunTime/Materials/PDFFiles/BreezeNET$_{13}$%20PRO11.pdf (Nov. 5, 2002), 2 pages, Tel Aviv, Israel, 2001.

Alvarion Ltd., "Wireless LAN," http://www.alvarion.com/RunTime/Products$_{13}$2010.asp?tNodeParam=16&fuf=1&PrintVersion=1 (Nov. 13, 2002), 2 pages, Tel Aviv, Israel.

Alvarion Ltd., BreezeACCESS II Base Station Equipment, http://www.alvarion.com/RunTime/Products$_{13}$2030.asp?tNodeParam=16&fuf=1&PrintVersion=1 (Nov. 19, 2002), 3 pages, Tel Aviv, Israel.

Alvarion Ltd., BreezeACCESS MMDS Base Station Equipment, http://www.alvarion.com/RunTime/Products$_{13}$2030.asp?tNodeParam=19&fuf=1&PrintVersion=1 (Nov. 19, 2002), 2 pages, Tel Aviv, Israel.

Alvarion Ltd., BreezeACCESS OFDM Base Station Equipment, http://www.alvarion.com/RunTime/Products$_{13}$2030.asp?tNodeParam=37&fuf=1&PrintVersion=1 (Nov. 19, 2002), 1 page, Tel Aviv, Israel.

Alvarion Ltd., Breeze ACCESS XL Base Station Equipment, http://www.alvarion.com/RunTime/Products$_{13}$2030.asp?tNodeParam?17&fuf=1&PrintVersion=1 (Nov. 19, 2002), 1 page, Tel Aviv, Israel.

Alvarion Ltd., BreezeLINK Technical Specifications, http://www.alvarion.com/RunTime/Products$_{13}$2015.asp48fuf=1&type=item&htmlName=BRL$_{13}$121$_{13}$2048.htm (Nov. 5, 2002), 4 pages, Tel Aviv, Israel.

Alvarion, Ltd., "Secure Broadband Wireless Network With BreezeACCESS & BreezeNet Pro.11," http://www.alvarion.com/RunTime/Materials/PDFFiles/WP$_{13}$BWAsecurity.pdf (Nov. 5, 2002), 6 pages, Tel Aviv, Israel.

ARM Ltd., "Atmel Announces 802.11 Media Access Controller for Wireless Applications," http://www.arm.com/news.nsf/html/4MTDF9?OpenDocument&style=Press$_{13}$Room (Nov. 4, 2002), 2 pages, San Jose, California, Mar. 22, 1999.

Arthur H.M. Ross, Ph.D., Limited, "Handoff," http://www.amug.org/~ahmrphd/Handoff.html, Jun. 28, 1996, 5 pages.

Baatz, S. et al., "Handoff Support for Mobility with IP over Bluetooth," Proceedings of the 25th Annual Conference on Local Computer Networks (LCN '00), pp. 143-154, Tampa, Florida, Nov. 2000, IEEE, Inc., Los Alamitos, California.

Bluesocket Inc., "Bluesocket BluePaper: Overview of Wireless Local Area Networking,"0 http://www.bluesocket.com/products/bluepaper.html (Nov. 20, 2002), 8 pages, Burlington, Massachusetts, 2002.

Bluesocket Inc., "Bluesocket Specifications," http://www.bluesocket.com/solutions/specs.html (Nov. 20, 2002), 3 pages, Burlington, Massachusetts, 2002.

Bluesocket Inc., "The Bluesocket Wireless Gateway Family," http://www.bluesocket.com/solutions/family.html (Nov. 20, 2002), 2 pages, Burlington, Massachusetts, 2002.

BreezeCOM Press Release, "BreezeCOM Announces Availability of MMDS Products in North America. Flexible Solution is Scalable and Easy to Install," 1 page, Altanta, Georgia, Jun. 6, 2000.

Commil, Ltd., "Commil Ltd. Raised $7M from Leading Israeli VCs," p. 10, in "News," http://www.commil.com.html.news.htm (Nov. 18, 2002), 13 pages, Petah Tikva, Israel, Jan. 3, 2001.

Commil, Ltd., "Commil's Technology," http://www.commil.com/html/technology.htm (Nov. 18, 2002), 1 page, Petah Tikva, Israel.
ECI Telecom Ltd., Company Profile, http://www.ecitele.com/company/company_13profile.asp (Nov. 5, 2002), 2 pages.
EDN Magazine, EDN Access, "RFID tags shrink and gain flexibility," SCS Corporation, San Diego, California, p. 16, in "Hot 100 Products of 1997: North America (1-50)," http://www.e-insite.net/ednmag/archives/1997/120497/25cs-01.htm (Nov. 5, 2002), 18 pages, Cahners Publishing Company, 1997.
Hlasny, D., "Synchronization of Bluetooth Access points," Version 1.0, Sharp Laboratories of America, 5 pages, Camas, Washington, Nov. 29, 2000.
InnoWave ECI Wireless Systems Ltd., "About InnoWave," http://www.innowave-ws.com/asp/sub.asp?sec=3&sub=5 (Nov. 5, 2002), 2 pages, Petach Tikva, Israel, 2001.
InnoWave ECI Wireless Systems Ltd., "eMGW, Your Wireless DSL Alternative for Data & Telephony Services," http://www.innowave-ws.com/files/pdf/eMGWbrochure.pdf (Nov. 5, 2002), 2 pages, Petach Tikva, Israel.
InnoWave ECI Wireless Systems Ltd., "enhanced MultiGain Wireless (eMGW)," http://www.innowave-ws.com/asp/sub.asp?sec=49&sub=314 (Nov. 5, 2002), 2 pages, Petach Tikva, Israel.
InnoWave ECI Wireless Systems Ltd., "Fixed Wireless Access—It's All We Do and We Do it All," http://www.innowave-ws.com/files/pdf/Stand%20Guide%200402.pdf (Nov. 5, 2002), 2 pages, Petach Tikva, Israel, 2001.
InnoWave ECI Wireless Systems Ltd., " MGW, MultiGain Wireless, Wireless Voice and Data for Your Residential Users," http://www.innowave-ws.com/files/pdf/MGWbrochure.pdf (Nov. 5, 2002), 2 pages, Petach Tikva, Israel.
InnoWave ECI Wireless Systems Ltd., "MultiGain Wireless (MGW)," http://www.innowave-ws.com/asp/sub.asp?sec=49&sub=312 (Nov. 5, 2002), 2 pages, Petach Tikva, Israel.
Katz, R., "CS 294-7: Cellular Telephony," CS Division, pp. 1-25, University of California, Berkeley, 1996.
Kvaser AB, WAVEcan Product Brochure, http://www.kvaser.com/global/pdfdocs/products/wavecan.pdf, 2 pages, Mölndal, Sweden, Nov. 2001.
Li, J. et al., "Channel Carrying: A Novel Handoff Scheme for Mobile Cellular Networks," 8 pages, IEEE, Inc., Los Alamitos, California, 1997.
Lucent Technologies, "AT&T and Digital Ocean to develop wireless LAN controller chip," http://www.lucent.com/press/0495/950412.nsa.html (Nov. 4, 2002), 2 pages, Utreecht, The Netherlands, Apr. 12, 1995.
Meihofer, E., "The performance of Bluetooth in a densely packed environment," Bluetooth Developers Conference, Advanced Technology & Applications Lab, Motorola, Inc., 19 pages, Dec. 4-7, 2000.
Park, V.D. and Corson, M.S., "Temporally-Ordered Routing Algorithm (TORA) Version 1 Functional Specification (Internet Draft)," http://www.ics.uci.edu/~atm/adhoc/paper-collection/corson-draft-ietf-manet-tora-spec-00.txt (Nov. 4, 2002), pp. 1-20, University of California, Irvine, Nov. 15, 1997.
Sangal, R., "Wireless Local Area Networks," http://www.ent.ohiou.edu/~sangal/lan.html (Nov. 4, 2002), 3 pages, Ohio University, Athens, Ohio.

Toloo, M. and Mouftah, H. T., "A Combinatorial Approach to the Analysis of Channel Allocation in Personal Communication Systems," Sixth IEEE International Symposium on Personal, Indoor, and Mobile Radio Communications, pp. 572-576, Toronto, Canada, IEEE, Inc., Los Alamitos, California, 1995.
Tolloo, M. and Mouftah, H. T., "Analysis of the Handover Issue in Mobile Personal Communication Systems Using N-Dimensional Space," 1995 Canadian Conference on Electrical and Computer Engineering, Sep. 5-8, 1995, Montreal, Canada, "Conference Proceedings—Engineering in the Global Village," vol. 1, edited by Francois Gagnon, pp. 547-550, IEEE Inc., Los Alamitos, California, 1995.
Toloo, M. and Mouftah, H. T., "Speed Considerations and Handover Mechanisms in Mobile PersonalCommunication Systems," Sixth IEEE International Symposium on Personal, Indoor, and Mobile Radio Communications, Toronto, Canada, pp. 841-845, IEEE, Inc., Los Alamitos, California, 1995.
Toloo, M. and Mouftah, H. T., "Traffic Characteristics Evaluation in Personal Communication Systems with Bernoulli User Sources," Proceedings of the International Conference on Parallel and Distributed Processing Techniques and Applications (PDPTA'95), Athens, Georgia, pp. 857-861, Nov. 1995.
Valko, A., "Cellular IP—A New Approach to Internet Host Mobility," http://www.acm.org/sigcomm/ccr/archive/1999/jan99/ccr-9901-valko.pdf (Nov. 18, 2002), ACM Computer Communication Review, vol. 29, No. 1, pp. 50-65, Association for Computing Machinery, Special Interest Group on Data Communications, Jan. 1999.
Wright, M., "Home-automation networks mature while the PC industry chases a new home LAN," http://www.e-insite.net/ednmag/archives/1998/060498/12df_13 02.htm (Nov. 5, 2002), 8 pages, EDN Magazine, EDN Access, Cahners Business Information, Jun. 4, 1998.
Albrecht, M. et al., "IP Services Over Bluetooth: Leading the Way to a New Mobility," Local Computer Networks LCN '99, Conference on Lowell, MA, USA Oct. 18-20, 1999, Los Alamitos, CA USA, IEEE Computer Society, pp. 2-11, XP010358529, 1999.
Bluetooth Specification Version 1.0B, "10. Channel Control," XP002937254, pp. 95-126, Nov. 29, 1999.
Hartson, J., "Bluetooth—The universal radio interface for ad hoc, wireless connectivity," Ericsson Review No. 3, XP-000783249, pp. 110-117, Ericsson, Stockholm, SE, 1998.

* cited by examiner

*Primary Examiner*—Duc Ho
(74) *Attorney, Agent, or Firm*—Perkins Coie LLP

(57) ABSTRACT

Disclosed is a system and method for wirelessly exchanging communications with at least one mobile unit in a network that includes base stations units. The method includes receiving a wireless communication from the mobile unit, where the wireless communication is under a wireless communications protocol that does not provide for handoff of communications links between base station units. The method also includes obtaining a unique session identifier for the communication with the mobile unit, and establishing a communications link with the mobile unit, where the communications link includes link context data associated with the mobile unit. The link context data associated with the mobile unit is identified at least in part based on the unique session identifier. The method further includes determining that the mobile unit is to be handed-off, and handing off to another base station unit the communications link and link context associated with the mobile unit, where the handing off is performed without assistance of the mobile unit.

27 Claims, 14 Drawing Sheets

Link Context Record

| | |
|---|---|
| Virtual Bluetooth device address ("BD_Addr") | <unique 48 bit address> — 1002 |
| BSU system clock offset (CLK_OFFSET) | <offset value> — 1004 |
| Active Member Address for MU | <integer 0:7> — 1006 |
| Encryption keys (optional) | <integer> — 1008 |
| BSU's IP Address | <local IP Address> — 1010 |
| Mode and timing parameters | <Mode: Sniff, Hold, Park>, <time> — 1012 |
| Mobile Unit ID ("BD_Addr") | <unique 48 bit address> — 1014 |
| Channel ID | <16 bit value> — 1016 |
| Link Initialization Time | <date, time> — 1018 |

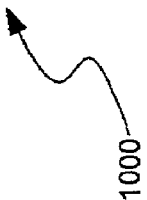

Fig. 10

1000

LINK CONTEXT MOBILITY METHOD AND SYSTEM FOR PROVIDING SUCH MOBILITY, SUCH AS A SYSTEM EMPLOYING SHORT RANGE FREQUENCY HOPPING SPREAD SPECTRUM WIRELESS PROTOCOLS

CROSS-REFERENCE TO RELATED APPLICATION(S)

This application claims the benefit of U.S. Provisional Patent Application No. 60/262,558, filed Jan. 18, 2001; Ser. No. 60/288,294 filed May 2, 2001; and Ser. No. 60/333,885 filed Nov. 28, 2001, currently abandoned.

BACKGROUND

The disclosed embodiments relate to wireless systems and networks.

Cellular mobile telephony provides voice and data links between users of mobile devices and fixed devices on a network. It gives users mobility without regard to how they are actually connected to the network. This is done by providing access points or base station units ("BSU") that can hand off the connections of mobile devices without interruption of the service. 2G (Second Generation) digital mobile phone service and AMPS (Analog Mobile Phone Service) are examples of such telephone networks.

Many limitations exist with such telephony networks. For example, while cellular mobile telephony networks generally provide service over large areas, such networks have limited capacity for the number of user devices that can be connected within the area covered by each BSU.

The bandwidth provided to users of this service is generally considered low bandwidth or "narrow-band access." Thus, large data applications, such as transferring of large data files, cannot be effectively performed using such networks.

Providers of this service must acquire rights to use regulated radio spectra, often at high investment costs. Thus, employing such networks can be quite expensive for many applications or users.

This type of service is often unavailable or unreliable in certain areas, such as office buildings, convention centers and train stations, due to physical properties of these areas and/or due to the density of users seeking access to the service.

The Personal Communications Network ("PCN") provides similar features to users of mobile devices, including voice and data links to a network, while providing mobility. PCN has a user model similar to that for cellular mobile telephony, so user behavior for one can be carried over to the other. PCN does not have the same limitations as cellular telephony. It offers wider bandwidth, or "broadband access," and can provide greater availability with higher reliability in those particular areas where cellular telephony cannot. The RF spectra used by PCN is unlicensed, and no special access rights are required.

PCN uses wireless networking technology, including IEEE 802.11, which uses direct-sequence spread spectrum, and Bluetooth, which uses frequency-hopping spread spectrum. Importantly, however, the Bluetooth wireless standard does not support movement from one area of coverage or "cell" to another.

Currently, the most well-known attempt to provide features that PCN offers in a mobile environment is referred to as 3G-(third-generation) wireless. 3G-wireless, however, is constrained by factors that do not constrain PCN implementations. These include heavy investment for the acquisition of spectrum usage rights.

PCN poses its own problems, including the mobility problem and handoff.

A link established between a mobile unit and a base station unit of a PCN is based on a complex set of properties shared between the mobile unit and the base station unit. Relatively simple AMPS cellular telephone service supports mobility without the active support of the mobile units, but the properties of the links are very simple. 3G-wireless service employs the active participation of the mobile unit to provide mobility, while the properties of the links for this type of service more closely resembles the properties of the links in PCN.

Thus, there is a need for a wireless networking system that solves the above problems, while providing the above benefits, as well as providing other advantages.

BRIEF DESCRIPTION OF THE DRAWINGS

FIG. 10 is a data structure diagram illustrating an example of a link context record.

Figure 1:
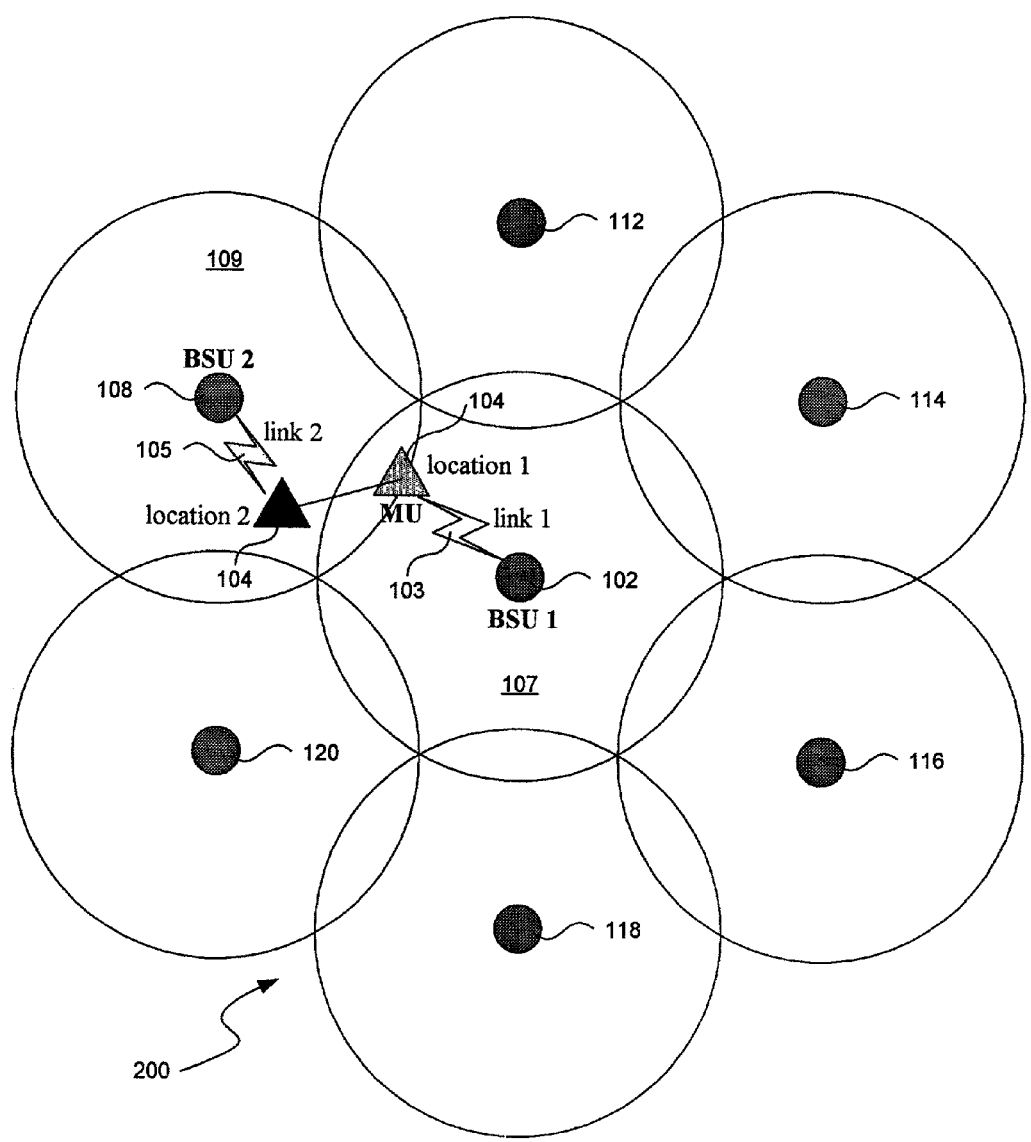
FIG. 1 is a schematic drawing showing a handoff of a mobile user device from one BSU to a neighboring BSU under one embodiment of the invention.

In the drawings, the same reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

Note: the headings provided herein are for convenience and do not necessarily affect the scope or interpretation of the invention.

DETAILED DESCRIPTION

Embodiments of the invention permit mobile units within a cellular network to move between network access points or base station units ("BSU") that are within "handoff range" while maintaining continuous communication context.

Described in detail below is a handoff method that maintains a link without the participation of the mobile unit in the handoff process. "Link context" represents a broad set of complex properties that are transferred from one BSU to another BSU. These properties include frequency hopping spread spectrum synchronization, time synchronization, and pattern correlation.

The inventors have found that no prior systems provide for link context mobility in at least a Bluetooth system, as described herein. Prior systems that do permit handoff generally require use of a mobile unit to facilitate handoff. Many prior systems are simplistic, and often focus on protocols such as the Internet Protocol ("IP").

Described below is a suitable system in which aspects of the invention may operate. Thereafter, details on one embodiment for providing link context mobility are provided. Software and functionality details are then provided. Finally, alternative embodiments are presented.

Aspects of the invention are described in detail below with respect to the Bluetooth specification. Bluetooth refers to a specification designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a cell phone) to send data wirelessly, such as exchange e-mails, transmit data to a fax machine, etc. Bluetooth operates in the unlicensed 2.4 GHz spectrum using frequency-hopping spread spectrum, where data packets are spread across the Bluetooth spectrum at a nominal rate of 1,600 hops per second to lessen interference and fading. According to the Bluetooth specification, Bluetooth devices operate their antennas at one of three different maximum antenna power levels, i.e., 1 mW, 2.5 mW and 100 mW. The nominal link range is 10 meters, and the gross data rate is 1 Mbps, although increases may be possible. Bluetooth can support both synchronous connection oriented ("SCO") links for voice and asynchronous connectionless ("ACL") links for packet data. Details on Bluetooth may be found at http://www.bluetooth.com; http://www.palowireless.com; "Bluetooth Revealed," Miller & Bisdikian, Prentice Hall PTR, 2001; "Bluetooth Demystified," Muller, McGraw-Hill, 2001; and in particular, "Specification of the Bluetooth System," version 1.1: http://www.bluetooth.com/developer/specification/specification.asp.

The Bluetooth specification does not identify how devices can perform a "handoff" between base station units. Thus, mobile units that conform to the specification, such as mobile telephones and personal digital assistants, are unable to maintain a link while moving about within an environment containing several distributed base station units, without employing benefits of the system described herein.

Methods of maintaining a Bluetooth link between a mobile unit (MU) and a network should not affect or interrupt applications running on the MU that use such a link, even while the MU moves about the area served by that network. As the MU moves about the area of the network, the physical link must be reassigned from one cell to another. The MU cannot be aware of this physical link reassignment, because it is not capable of actively assisting.

The methods and systems described herein provide mobility without active assistance of the MUs. These systems provide superior mobility even if the MUs were capable of providing assistance using existing Bluetooth methods for establishing a link. They do this by performing the handoff faster than those existing Bluetooth methods operate. In so doing, these systems allow more efficient use of available bandwidth by eliminating protocol exchanges between the MU and a BSU. This is notwithstanding the fact that existing Bluetooth methods do not support uninterrupted handoffs in any form when they establish a link.

The following description provides specific details for a thorough understanding of, and enabling description for, embodiments of the invention. However, one skilled in the art will understand that the invention may be practiced without many of these details. In other instances, well-known structures and functions have not been shown or described in detail to avoid unnecessarily obscuring the description of the embodiments of the invention.

A Suitable System

As introduced above, the Bluetooth specification defines a protocol for device-to-device and device-to-network communication in a small area. The size of the area is determined by the maximum range over which these devices can communicate and is a function of their radio performance. Communication is not possible if an MU is located outside the maximum range. When such devices communicate, they first establish a link and then maintain that link for the duration of their communication. If the link is interrupted for any reason, then communication is also interrupted.

FIG. 1 shows a device-to-network link 103 shown as "link 1." Here, an MU, or mobile unit 104, represents the wireless mobile device. An access point picocellular system node, shown as a stationary BSU, or base station unit 102, provides an interface to a network (not shown in FIG. 1). The terms "mobile unit" and "MU" are used interchangeably herein, as are "base station unit" and "BSU." A picocellular system node typically refers to a wireless base station with extremely low power designed to cover an extremely small area, such as one floor of an office building. Indeed, short-range wireless communication as described herein generally refers to an effective range of 500 meters or less (and with Bluetooth, often less than 100 meters), although some systems may reach up to 1 kilometer depending on the wireless transmission protocol and power level. Base station units described herein are generally fixed relative to a given location. The location may be any stationary building or geographic space (such as a parking lot or park). Alternatively, the BSU may be fixed relative to a movable object, such as a vehicle (e.g., train, ship or plane).

A large circle 107 represents the maximum range of communication between these two devices at a given transmission power class-the "domain" of the BSU. While the maximum range limits the coverage of a single BSU, a Pocket Mobility Network ("PMN") system employs multiple distributed BSUs to cover a large region. In general, a cellular communications network typically consists of a collection of BSUs, where the BSUs provide wireless access points for mobile users to obtain a communication link to a wide range of information and communication services. An important feature of a cellular communications network is that mobile units can "roam" from one BSU to another within the system and not experience any disruption of the communication link while doing so. When a mobile user roams from one BSU to another, a procedure called "handoff" is performed, where the link is actually transferred from the currently connected BSU to a neighboring BSU. To ensure the best performance, the handoff process should be as fast and efficient as possible. In addition, data throughput should be as high as possible.

In FIG. 1, a collection of fixed access points, or BSUs 102, 108 112, 114, 116, 118 and 120, are all able to establish a link with the MU 104 and, when it is within their range, provide access to the network. The large circles around each BSU illustrate the operating coverage or domain of each BSU (e.g., circles 107 and 109 are associated with BSUs 102 and 108, respectively). Typical BSU placement allows for overlapping areas of coverage. The BSU that actually participates in a link is generally the one that has the strongest signal at the MU (but other factors may affect this, as well). When that signal weakens, a handoff may occur. A handoff of the link may be made from the BSU 102 to the neighbor BSU 108, creating a new link 105 (link 2).

When the MU 104 first establishes a link with a BSU, it does so using the same procedures it might use to communicate with any other Bluetooth device. To the MU, the BSU behaves exactly like any other Bluetooth device that operates in conformance with the Bluetooth specification. Thus, it does so while not requiring any modification to MU devices that comply with the Bluetooth specification. In the example of FIG. 1, after establishing link 1, the MU 104 can continue to communicate with the network through the BSU 102 for as long as necessary, as long as it stays within the domain of the BSU. While aspects of the invention are described herein as employing the Bluetooth protocol, those skilled in the relevant art will recognize that aspects of the invention are equally applicable with other communication protocols and standards, including IEEE 802.11, Home RF, etc.

When the MU 104 moves, it may move within the range of another BSU (e.g., shown in FIG. 1 as the MU moving from location 1 near the first BSU 102 to location 2 near the neighbor BSU 108, where the MU establishes a new link with the neighbor BSU 108). If the MU moves beyond the range of the first BSU 102, the link with the neighbor BSU 108 can be used to maintain uninterrupted communication with the network, provided that a new link is established before the link with the first BSU is lost. In other words, the MU 104 must establish a link 2 with the BSU 108 in a new domain 109.

Under one embodiment, the PMN is designed in a fashion similar to the General Packet Radio Service ("GPRS") system architecture and, thus, may use much of the same terminology. The PMN includes multiple BSUs (or alternatively, a BSU with multiple base transmitter stations and a BSU controller) and a PMN system controller ("PSC") to manage the BSUs. A backbone controller to link the BSUs and controller with RF or other wireless links, instead of cabling, may be employed. A network service provider may supply various devices to provide connectivity to networks beyond the immediate premises (or other coverage area) as part of a complete service.

Each BSU includes at least a Bluetooth RF module, a general purpose microprocessor (baseband controller) with memory (e.g., RAM) and an antenna. The BSUs may mount on a ceiling and provide radio coverage within an approximate 10-meter radius. Each BSU may run asynchronous connectionless links and/or synchronous connection oriented services for data and voice connectivity and a control stack, and a voice-over IP software module. Each BSU is based on available Bluetooth chip modules and available Bluetooth protocol stacks. For example, a lower Bluetooth protocol stack (that works with the baseband layer) is available from Tality Ltd. of Scotland, U.K. An upper Bluetooth protocol stack (networks with the host layer) is available from Extended Systems, Inc.

The BSUs may each be directly connected to the PMN by using appropriate cabling, such as Category 5 cabling. Such cabling is necessary to provide not only a signal path therebetween, but it may also supply power to the BSU. Alternatively, a link with the BSU controller may be accomplished via wireless techniques. Wiring may be required, however, to provide power to the BSUs.

The PSC may include multiple interfaces (such as Ethernet interfaces), a processor module, a switching module and interfaces for channelized voice and LAN/WAN or other connectivity (including packetized voice). The PSC software modules may include a voice stack, a data stack and a control stack. The control stack handles mobile unit tracking and handoffs, user management and session management.

A network service provider providing the PMN may also include a channelized (standard) private branch exchange ("PBX"), a voice over IP PBX switch, a direct connection to the public switched telephone network ("PSTN"), a router (for data, voice over IP, or both), a server (for providing various application), a cache, etc. Prepackaged applications for vertical markets, such as hospitals, theme parks, malls, airports, for enterprises and service providers, for private networks in a public space, etc., may also be provided with the PMN.

Figure 2:
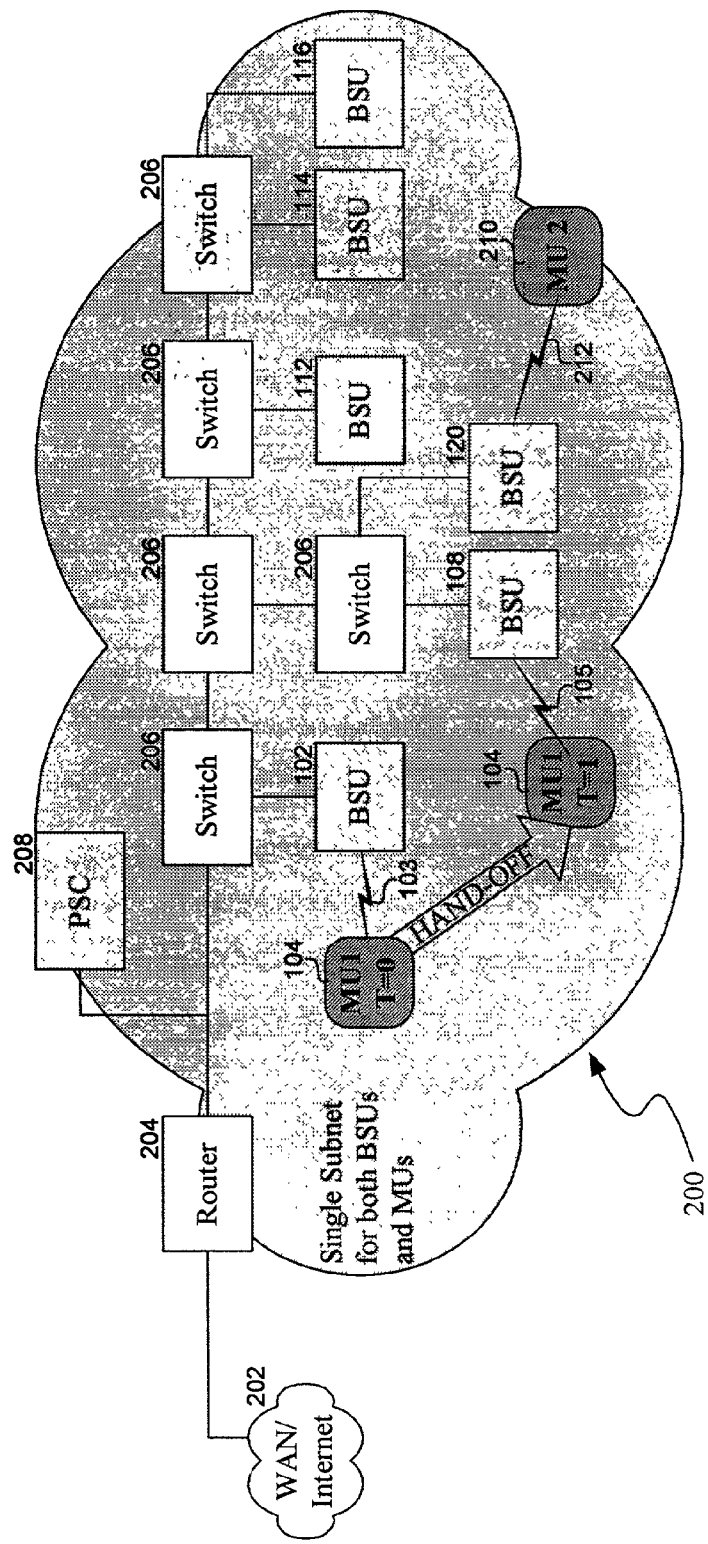
FIG. 2 is a block diagram illustrating a single Internet Protocol ("IP") subnet architecture. All BSUs and mobile units are assigned addresses within this single subnet.

An example of a PMN is shown in FIG. 2. Referring to FIG. 2, the BSUs are coupled to the Internet or wide area network ("WAN") 202 by way of an router 204 and switches 206. As shown in FIG. 2, each BSU is coupled to one switch. Each BSU acts as a bridge between a wired local area network ("LAN") that includes the BSUs, switches 206 and router 204, and the wireless links to the mobile units (e.g., wireless links 103 and 212 to MUs 104 and 210). The LAN is implemented using Ethernet or an appropriate alternative technology. A PMN system controller ("PSC") 208 or "system controller" is coupled to the network 200 or subnet and acts as a systems data communication gateway providing mediation between the PMN and the Internet or WAN 202. While the Internet or WAN 202 is shown, the subnet may be coupled with other networks, such as a LAN, the PSTN or a public land mobile network. The PSC switches voice and data communications to the appropriate wired or wireless network to which the subnet is coupled.

The PSC and BSUs may employ the Bluetooth LAN access profile ("LAP"). The LAP uses established networking protocols to enable a computing device or MU to obtain access to a data network. Use of the LAP is analogous to directly connecting to a data network, such as via Ethernet. Further details regarding LAP may be found in the Bluetooth protocol noted above.

The network 200 forms the entire domain of the PMN, which is the domain over which a mobile unit can be handed off. If a mobile unit can be handed off between BSUs, then those BSUs are on the same PMN. The router 204 that connects the PMN or subnet both logically and physically to the rest of a corporate network (e.g., WAN 202) is the first router in the data path for MUs communicating with nodes outside the subnet and may be running network address translation ("NAT").

NAT refers to an Internet standard that enables a LAN to use one set of IP addresses for Intranet traffic and a second set of addresses for external traffic.

This allows a company to shield internal addresses from the public Internet. This would allow the network 200 to connect to the Internet or WAN 202 while not all hosts within the network have globally unique IP addresses. Thus, NAT enables the network 200 to use nonregistered IP addresses to connect to the Internet.

The NAT-enabled router translates internal local addresses to globally unique IP addresses before sending packets outside the network 200. Many ways of implementing NAT exist.

Most models of cellular-like systems from General Packet Radio Service ("GPRS") use a non-routed Radio Access Network ("RAN"). In other words, the IP address of the mobile unit is not used to locate the mobile unit once the packet is inside a gateway router. In GPRS, the serving GPRS support node ("SGSN") maintains a mapping of IP addresses to telephone numbers to keep track of locations of mobile units by telephone numbers. As a mobile unit is handed off from one BSU to another, the SGSN tables are updated.

Figure 3:
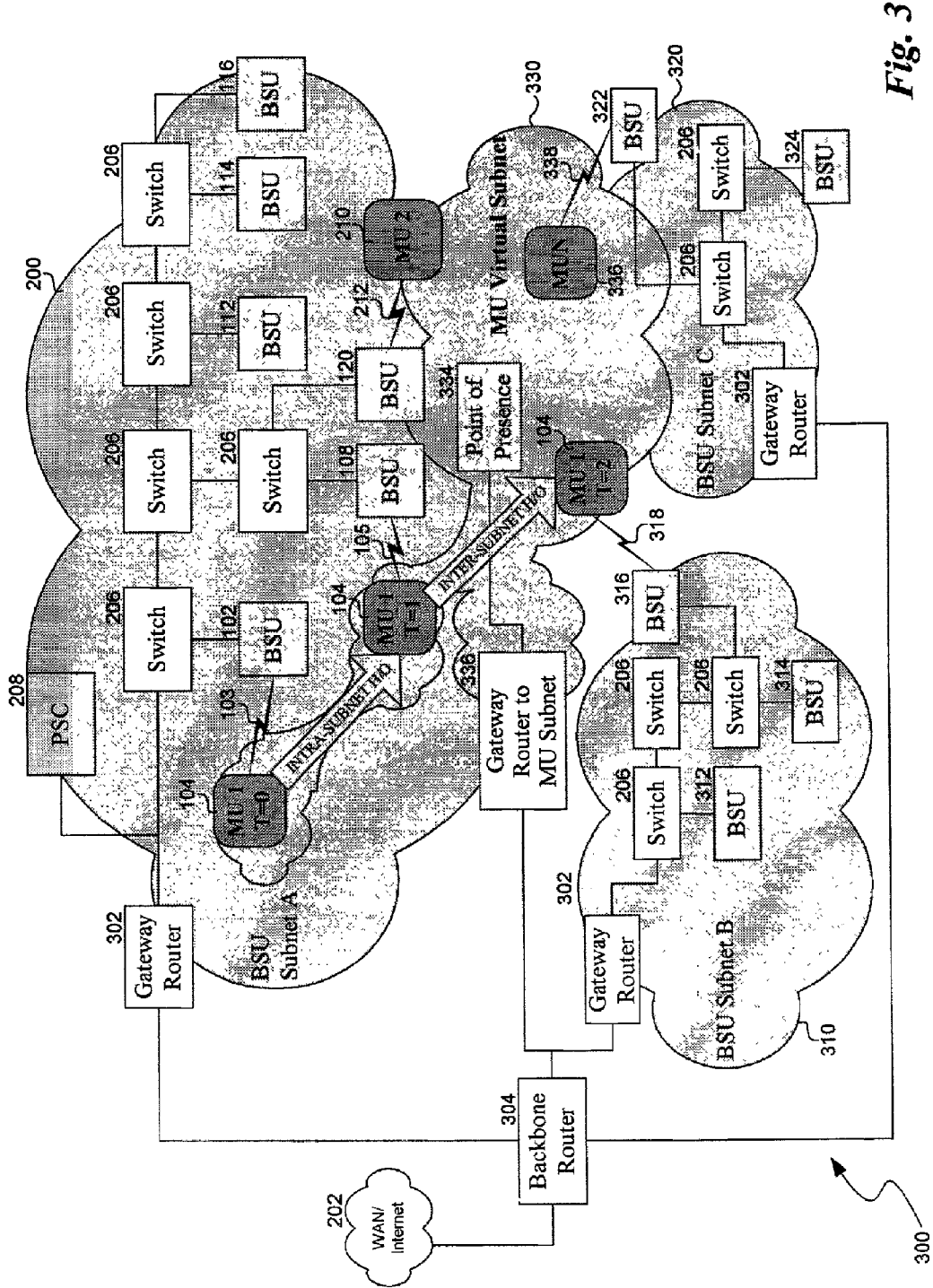
FIG. 3 is a block diagram of a multiple subnet architecture where BSUs and mobile units are assigned addresses that fall within multiple IP subnets. In this embodiment the mobile units belong to a separate subnet dedicated to the mobile units and their point of presence.

The pocket mobility network described in FIG. 3 (the multiple subnet architecture) follows a model similar to GPRS. A simplifying factor is that the PMN uses Ethernet within a network or subnet. Once a node (e.g., BSU) makes itself known to the network (described below), the switches 206 and routers that comprise the subnet will keep track of the correct routing for packets addressed to that node. Another simplifying factor is that the FIG. 3 (the multiple subnet architecture) PMN is a fully routed network.

Multiple subnets may be interconnected to create a larger installation where BSUs and MUs are assigned IP addresses that fall within multiple subnets.

As shown in FIG. 3, a network 300 consists of three physical subnets 350, 310 and 320, each connected by an MU virtual subnet 330 that includes an MU 331 and the MU 104. As shown, all three subnets 350, 310 and 320 are similar to the previously described network 200, except that none of them contain the subnet to which the MUs belong: the first subnet 350 includes the BSUs 102, 108, 120, 112, 114 and 116 coupled to switches 206 which in turn are coupled to a gateway router 302; the second subnet 310 includes BSUs 312, 314 and 316 coupled to switches 206, which in turn are coupled to a gateway router 302; while the third subnet 320 includes BSUs 322 and 324 coupled to another gateway router 302 by way of switches 206. Between subnets, packet traffic passes through the gateway routers 302 to gain access to a backbone, which can be a backbone router 304. The gateway routers 302 are typically edge routers and may be running, for example, NAT. Alternatively, NAT may be run on the backbone router 304.

Figure 4:
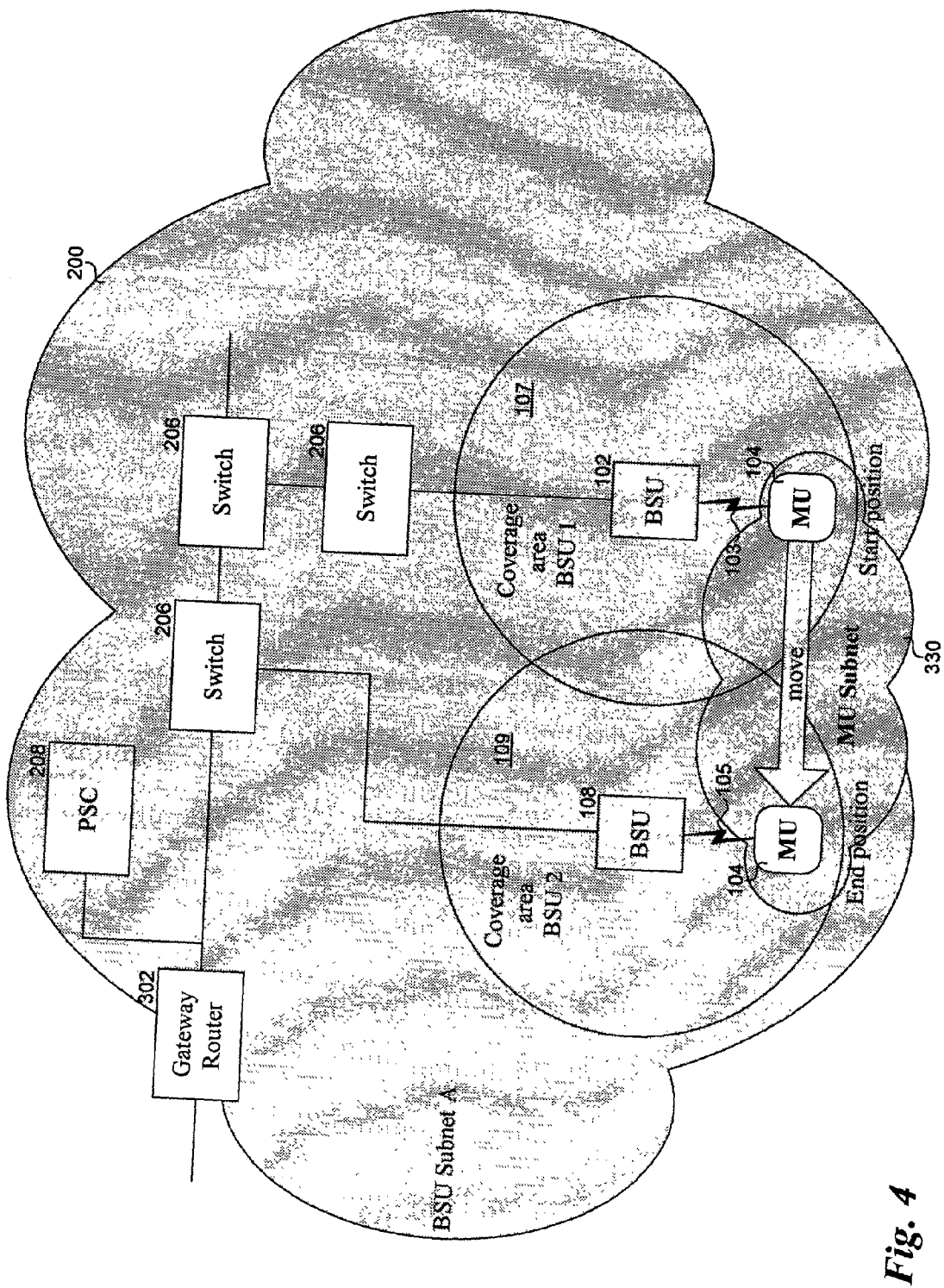
FIG. 4 is a block diagram illustrating an intra subnet handoff from one BSU to another under the network of FIG. 3.

FIG. 3 illustrates both intrasubnet and intersubnet handoffs within the multiple subnet architecture ("MSA"). An intrasubnet handoff, such as between BSUs 102 and 108, is shown in more detail in FIG. 4. Such an intrasubnet handoff is similar to that described above with respect to FIG. 1 and is defined as a handoff where the initial or owner BSU and neighbor or target BSU are on the same subnet.

Figure 5:
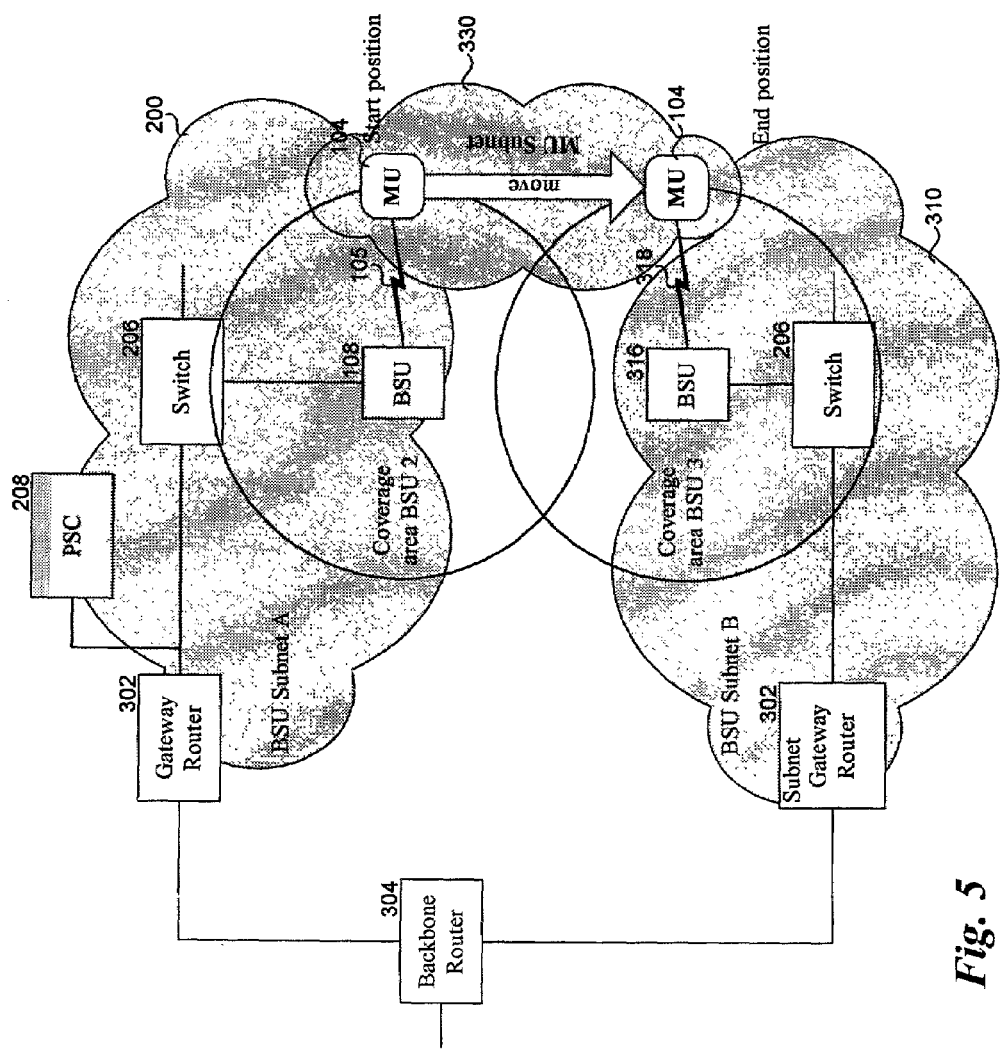
FIG. 5 is a block diagram illustrating an inter subnet handoff of a mobile unit from a BSU in one subnet to a BSU in another subnet under the network of FIG. 3

Alternatively, and shown in greater detail in FIG. 5, an intersubnet handoff is defined as a handoff where the initial and target BSUs are on different subnets, such as the BSU 108 associated with the first subnet 350 and the BSU 316 associated with the second subnet 310. The MU 104 moves from the domain of the BSU 108 to the domain of the BSU 316. The wireless link 105 with the BSU 108 is dropped in favor of a new wireless link 318 established with the BSU 316.

The MSA shown in FIG. 5 forms a virtual subnet for the mobile units and set of BSUs together with a point of presence 334 (shown in FIG. 3). The point of presence 334 is defined to be the device on the MU virtual subnet 330 that is physically attached to the wired LAN or network (coupled to the backbone router 304 by way of a gateway router 336). The MU virtual subnet 330 is a real subnet in a logical sense, and is logically attached to each of the BSU subnets 350, 310 and 320 by way of the point of presence 334.

Figure 6:
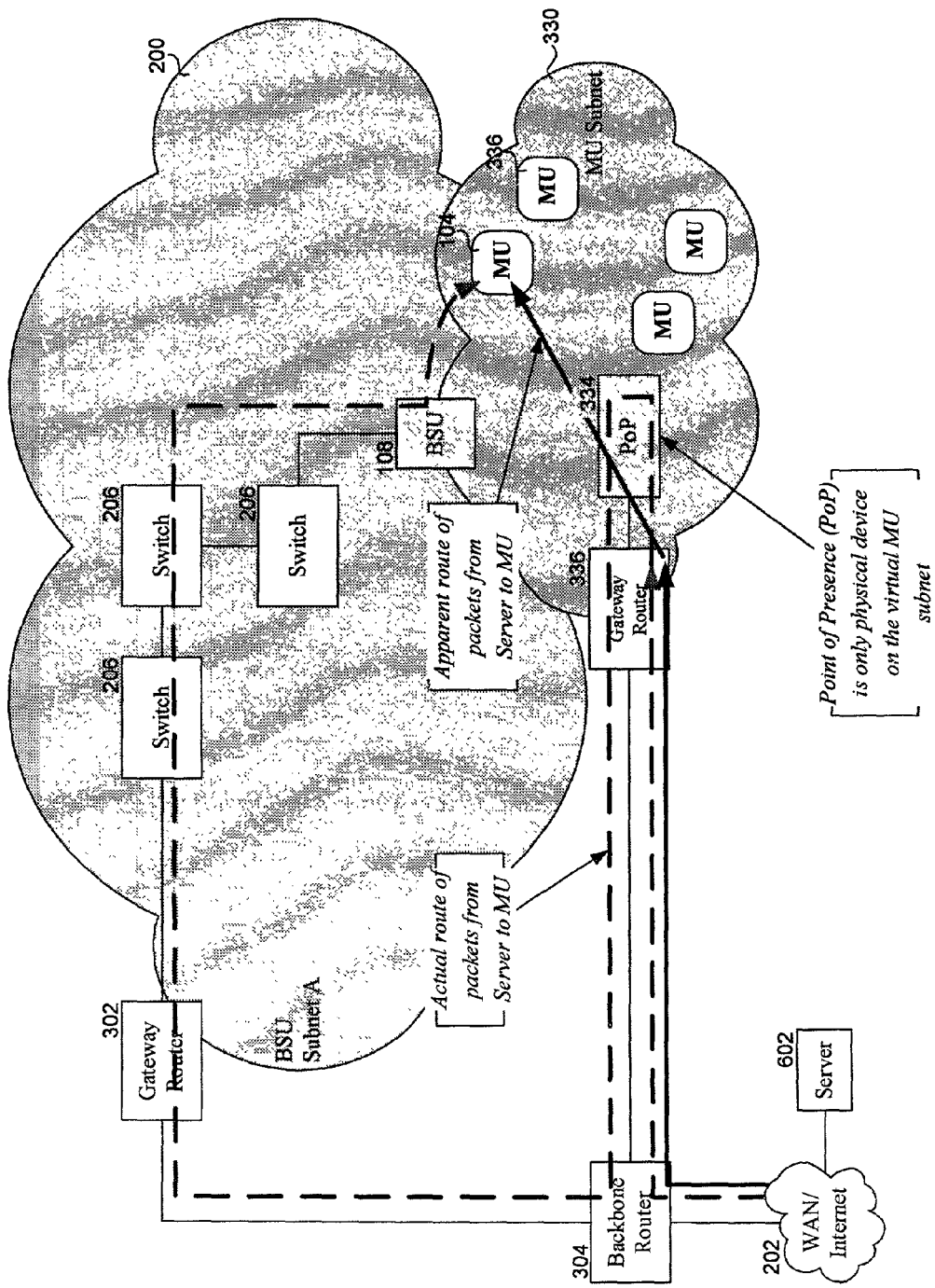
FIG. 6 is a block diagram showing logical and actual routes of packets from a host or server to a mobile unit under the network of FIG. 3.

FIG. 6 shows how the gateway router 336 provides access to the MU subnet 330 and the point of presence 334. The gateway router 336 may be a separate device, or it may be combined with the point of presence 334. The logical route for packets from a host or server 602 to, for example, the MU 104 is over the wired LAN or backbone network to the point of presence 334 and directly to the MU 104 (as shown as the solid arrows in FIG. 6). The actual route of packets is not directly from the point of presence 334 to the MU 104 but back through the gateway router 336, backbone router 304, gateway router 302 associated with the subnet 350, through switches 206 and to the BSU 108, all over the backbone network. Mobility under IP, such as via a tunneling protocol, provides communication between the point of presence 334 and the appropriate BSU 108. The point of presence 334 may be part of the PSC 208 (shown in FIG. 3), or it could be distributed across one or more BSUs. The point of presence and PSC 208 are shown as two separate entities in FIG. 3 because they are logically separate. They may be implemented, however, as separate blocks of code on a single server (e.g., a single Linux server).

Bluetooth Link Context Mobility Embodiment

Overall operation of the above PMN is as follows. An MU initially communicates with the PMN by connecting to a BSU that is part of the PMN.

Establishing a link under the standard Bluetooth protocol between an MU and a nearby BSU enables this. Link context is defined for a link between the MU and BSU. That link context is transferred from one BSU to another BSU in the PMN so that the MU can continue its communication with the network without interruption as the MU moves within the network. A BSU can support a multiplicity of link contexts and the corresponding links associated with them. The MUs that initiated those links can communicate through any BSU that provides the correct link context.

Standard Bluetooth procedures for establishing a link do not allow this mobility between domains of different BSUs. Each time a link is established using standard procedures, the context of that link, in its representation within the MU, is separate from of the context of the original link. The MU cannot make an association between the new link and the original link. Consequently it cannot transfer communications from one link to another. If the original link is interrupted, the new link cannot be an adequate substitute that maintains the MU's communication with the network without interruption.

Embodiments of the invention overcome these problems in standard Bluetooth procedures and provide additional benefits. A BSU that establishes a link with an MU by normal Bluetooth procedures (as when the MU first forms a link with the PMN) presents a unique virtual identity of itself to each MU. A BSU can thereby support a multiplicity of active links greater than 7 (the limit set by the Bluetooth specification), using unique virtual identities as part of each link context. Methods for making link contexts unique are described herein.

The context of the original link (e.g., link 1 in FIG. 1), which includes all of the parametric values that define it, is transferred to the neighboring BSU (BSU 108 and link 2). The neighboring BSU operates with that context for the purpose of maintaining communication between the MU and the network. The link is virtualized so that it can be transferred to any of the BSUs within the collection that make up the PMN. Transferring the link context from one BSU to another BSU is generally referred to herein as "link context mobility."

Figure 7:
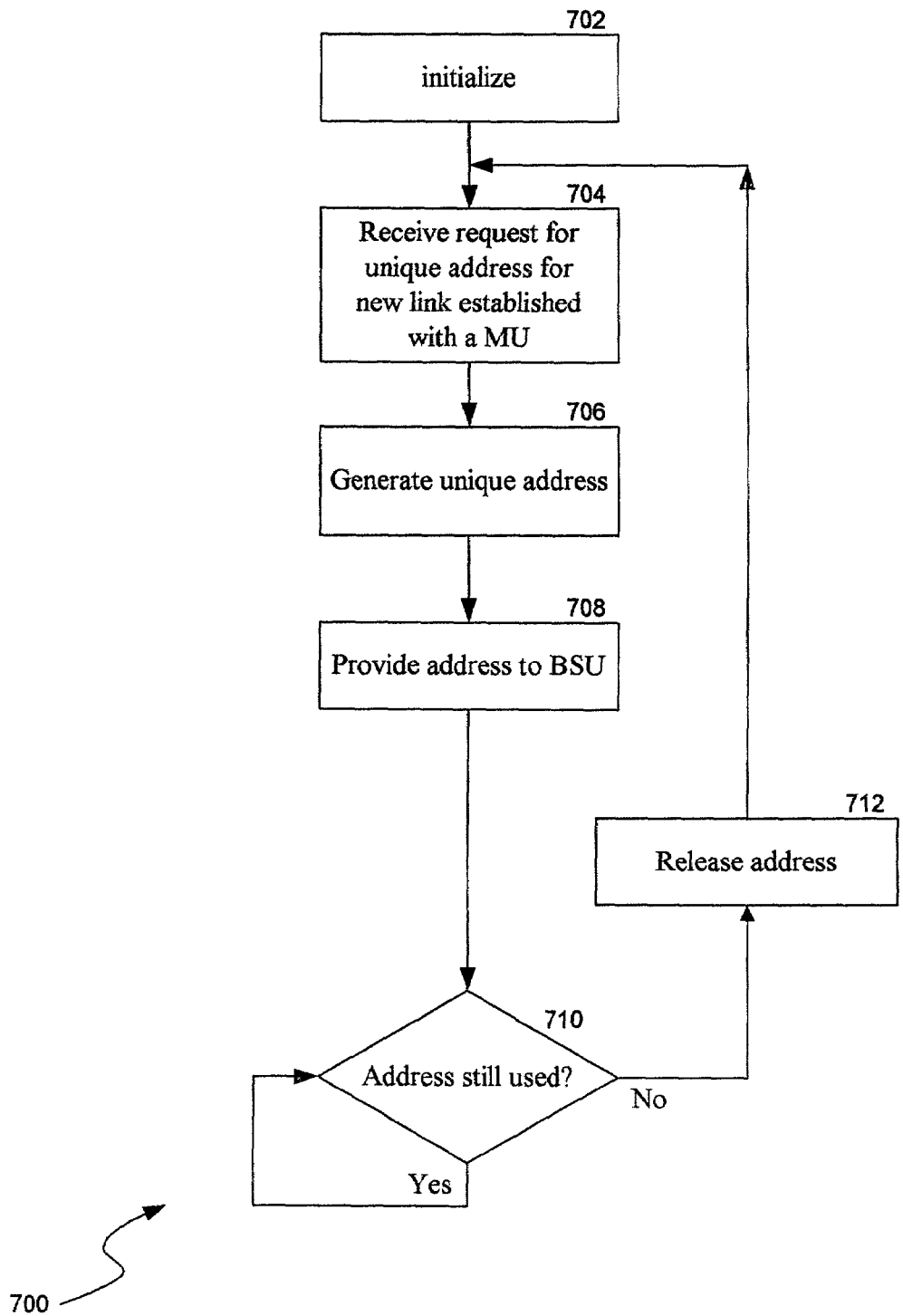
FIG. 7 is a flow diagram illustrating a routine for generating unique addresses for establishing link context for mobile units in the system of FIG. 1.

Referring to FIG. 7, one embodiment of the invention employs the Bluetooth Device Address ("BD_ADDR") as a unique session or link identifier to create a different apparent value that can be used for each link, instead of using the fixed BD_ADDR value of the BSU on every link. A central controlling authority generally provides Bluetooth Device Address values. The general practice of such an authority is generally to allocate blocks of Bluetooth Device Addresses to manufacturer's of equipment, leaving it to each manufacturer to issue addresses from their assigned block in order to maintain the global uniqueness of those Addresses.

This embodiment of the invention supports that intent to maintain uniqueness. BSUs are only allowed to have virtual Bluetooth Device Addresses from a block of addresses reserved for this purpose, and obtained from the controlling authority, so no other devices except BSUs would have legitimate claim to the use of those Addresses. Thus, the address values that are used in the PMN adhere to the conventions for their use, as established by that controlling authority.

A unique virtual address generating routine 700 begins in block 702 by initializing the routine at a central server, such as the system controller 208.

Unless described otherwise herein, the functions in the blocks depicted in FIG. 7 are well known or described in detail in the provisional patent applications noted herein. Indeed, much of the detailed description provided herein is explicitly disclosed in the provisional patent applications; most or all of the additional material of aspects of the invention will be recognized by those skilled in the relevant art as being inherent in the detailed description provided in such provisional patent applications or will be well known to those skilled in the relevant art.

In block 704, the system controller 208 receives a request from a BSU in the PMN for a unique address with which to establish a new link with the MU.

Both the MU and the BSU operate according to the same Bluetooth profile, such as dial-up networking or LAN access. Which profile used under a new link is determined by each MU. Under an alternative embodiment, the system supports only the LAN access profile, because the dial-up networking profile is not required to support multiple mobile units connected to an access point, such as a BSU.

In block 706, the system controller 208 generates a unique address to be used by the BSU for the link that is to be established with the MU. Under one embodiment, the system controller provides IP addresses from a DHCP (Dynamic Host Configuration Protocol) server. DHCP is a protocol for assigning dynamic IP addresses to devices on a network. With dynamic addressing, a device can have a different IP address every time it connects to the network, and in some systems, the device's IP address can even change while it is still connected. DHCP simplifies network administration because the software keeps track of IP addresses rather than requiring an administrator or specially designed software to manage the task.

The DHCP server is a central management point that assures that all of the provided addresses are not in use and that all addresses are unique, and manages the re-use of addresses after they have been returned. Many DHCP servers exist from different manufacturers, such as a Linux based server. The system controller 208 generates an IP address and then maps the IP address to a Bluetooth Device Address using a one-to-one mapping algorithm. An example of the algorithm is:

IP⇌BD_ADDR
aa:bb:cc:dd⇌xx.yy.zz.bb.cc.dd where each letter group (e.g., "aa") represents a single byte. The first three bytes xx.yy.zz in the BD_ADDR usually represent a manufacturer's identification code, so each manufacturer would have a unique 3 bytes here, which the system controller would use in every BD_ADDR value. An organization may then use the lower three bytes, namely bb.cc.dd (for a range of values between 00:00:00 to FF:FF:FF). If available IP addresses fall within a range [aa:0x00:0x00:0x00, aa:0xFF:0xFF:0xFF], then the system controller would generate BD_ADDR values that would fall in the range [xx.yy.xx.0x00.0x00.0x00, xx.yy.zz.0xFF.0xFF.0xFF]. Since the IP addresses are unique, the BD_ADDRs are also unique.

When generating unique BD_ADDRs, the particular PMN may intentionally narrow the range of available addresses, such as if one or more independent PMNs are in close proximity to each other. To assure that a generated Bluetooth address value does not get generated and used in two nearby PMNs, each PMN might have constraints that limit addresses to a narrower range. For example, one PMN and all of its BSUs may have a constraint to generate addresses in the range from aa:bb:cc:00:00:00 to aa:bb:cc:7F:FF:FF, while the other PMN and all of its BSUs would have a constraint to generate addresses in the range from aa:bb:cc:80:00:00 to aa:bb:cc:FF:FF:FF.

In block 708, the central controller 208 provides the unique virtual Bluetooth Device Address to the requesting BSU. The BSU then employs this virtual address to establish a link with the MU. As the MU roams within the PMN, this virtual address, and other link context data, is transferred to neighboring BSUs to maintain communications with the MU as it moves between BSU domains in the PMN.

The system controller 208 communicates with the BSUs as the MU moves about the PMN. Thus, under block 710, the system controller 208 can determine whether the generated unique address is still used. If the link with the MU is lost or cleared, this fact is reported by one of the BSUs to the system controller. As a result, in block 712, the system controller 208 releases the address so that it may be reused by the network.

Software and Functionality Details

In one embodiment, each BSU employs various layers of software under the Bluetooth protocol. Each BSU further includes a radio environment monitoring ("REMon") and radio environment management ("REMan") software, that includes a radio environment management component that operates above the host controller interface ("HCI"), and a radio environment monitoring component that operates below the HCI, together with baseband components of the Bluetooth protocol. BSU neighbor discovery and BSU synchronization functions are performed in conjunction with the REMan and REMon components, within the radio environment monitoring and management software. The REMon component functions to receive a set of records from REMan, where the records indicate which MUs to monitor. Each record in the set identifies the MU to monitor, performance indicator types to be measured (e.g., signal strength, signal to noise ratio, error rate, etc.), and the time slot the MU is to be monitored on.

Figure 8:
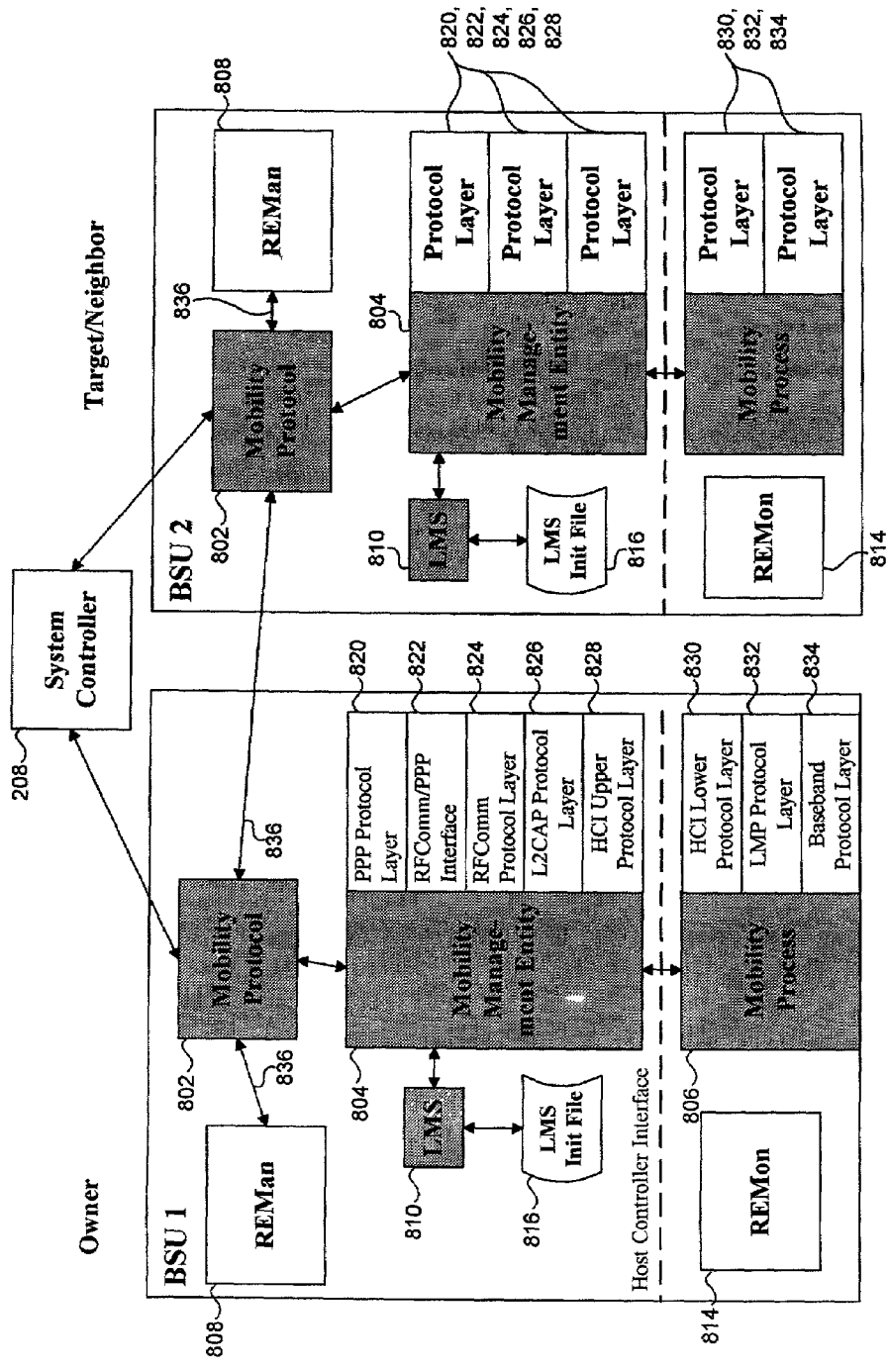
FIG. 8 is a block diagram illustrating mobility management and other software components employed by two neighboring BSUs.

Referring to FIG. 8, software operating on two neighboring BSUs is shown. The discussion of software for one BSU is described below; those skilled in the relevant art will recognize that the software is substantially similar to that in the neighboring BSU.

A mobility management process includes a mobility protocol 802, a mobility management entity 804 and a mobility process 806. The mobility protocol 802 performs generic mobility link establishment and link handoff (creating and clearing links), as well as requesting assistance from REMan software 808 and a peer mobility protocol in a target or neighboring BSU. Actual handoff at the protocol layer level is described using an abstraction layer, namely the mobility management entity 804. The mobility management entity 804 (also referred to as "MME" below) provides a protocol independent interface between the mobility protocol 802 and various protocol layers, such as those under the Bluetooth protocol (as described below). Unlike the mobility protocol 802 and mobility management entity 804, which operate above the HCI, the mobility process 806 operates below the HCI and interfaces between the mobility management entity and lower layers of the Bluetooth protocol stack. Link management support ("LMS") software 810 assists the mobility management entity 804 in establishing, creating and clearing a link, as described herein. The LMS software 810 is a protocol dependent set of support functions that is hidden to all but the mobility management entity 804.

Details regarding the mobility protocol 802 include the following. The mobility protocol 802 and LMS software 810 assists in, for example, adding a new MU to the PMN by assisting in setting up a unique link context, including a unique address as noted above, for the link. Once the new link with its associated new link context are established, the mobility protocol 802 notifies REMan 808 of this fact so that link performance metrics can be evaluated on a regular basis. The mobility protocol 802 is also notified when a handoff should occur. In a role as a "link owner," the mobility protocol 802 exchanges a sequence of messages with the mobility protocol of the neighboring or target BSU, and with various mobility extraction layers (e.g., IP, Bluetooth, Voice over IP) within its own BSU (the owner BSU), for the purpose of clearing the link at the owner BSU.

When in the owner role, the mobility management entity 804 informs the mobility protocol 802 of a new link being established with an MU. The mobility protocol 802 and LMS software 810 registers the link in a database or LMS file 816 for future reference, where the link includes link context information described in detail below. Following such notification, the mobility protocol 802 in turn informs REMan 808 of this link, and provides a reference thereto in the database file 816.

Figure 9:
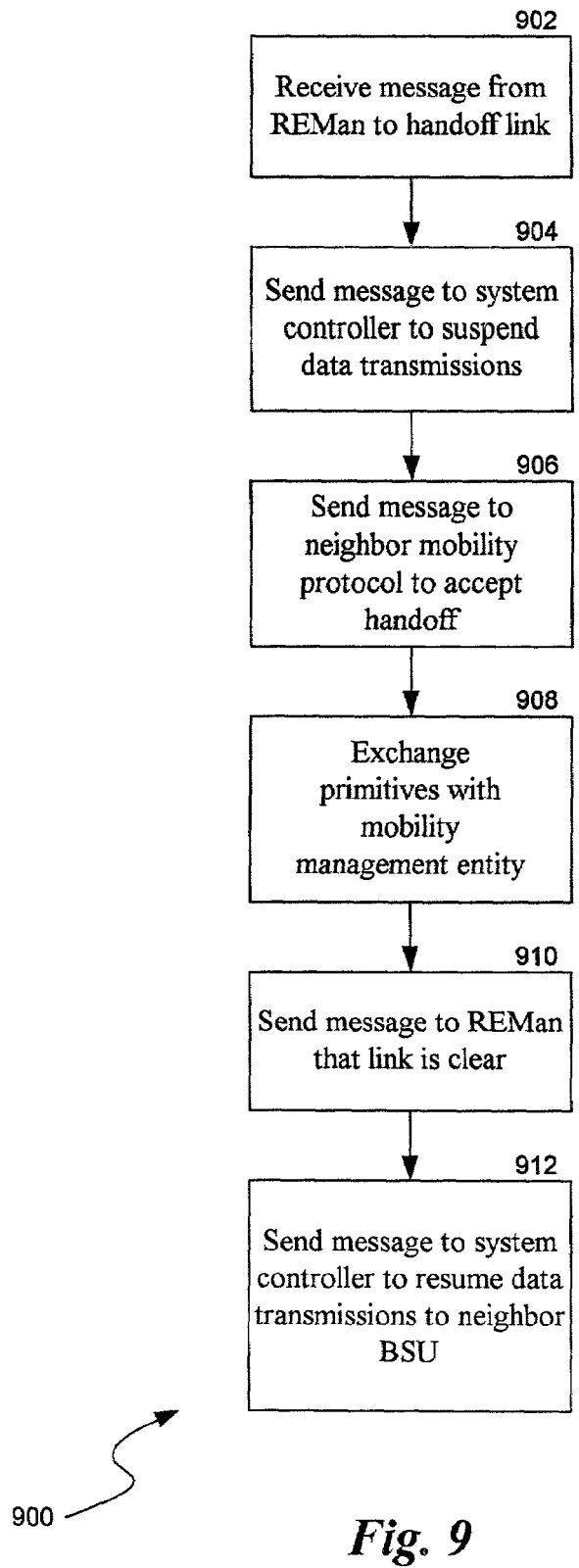
FIG. 9 is a flow diagram illustrating functions performed by a mobility protocol of FIG. 8 in clearing a link during a handoff.

The handing off of a link with associated link context is shown with respect to FIG. 9. Details regarding hand off procedures are well known in the art, and many of known hand off techniques may be employed by the PMN. For example, REMon 814 monitors link quality with an MU, and reports such link quality parameters to REMan 808. When link quality with the MU falls below a threshold (or for other reasons), a routine 900 begins in block 902 where the mobility protocol 802 of the owner BSU receives a message from REMan 808 to execute a handoff to the target or neighbor BSU. In block 904, the mobility protocol 802 sends a message to the system controller 208 to suspend data transmissions to the MU related to the link to be handed off. This step may be omitted, which results in lost data. The lost data may be recovered through the operation of other protocols such as TCP, or simply ignored, as when transmitting voice. In block 906, the mobility protocol 802 sends a message to the mobility protocol 802 of the target BSU to request the target BSU to accept the handoff. An exchange of messages may occur between the owner and target mobility protocols 802 to determine whether the handoff may be performed. Further, link context is transmitted to the target BSU.

In block 908, the mobility protocol 802 exchanges primitives with the mobility management entity 804 to clear the link from the owner BSU. In block 910, the mobility protocol 802 sends a message to REMan 808 that the link is clear at the owner BSU. Thereafter, in block 912, the mobility protocol 802 of the owner BSU sends a message to the system controller 208 to direct the system controller to resume data transmission related to the link to the target BSU.

Details regarding the mobility management entity 804 include the following, with further details provided below. The mobility management entity 804 clears and creates protocol layer configurations related to a particular MU and its link.

When the mobility protocol 802 sends a primitive to clear a link under block 908, the mobility management entity returns the state of that link for each protocol layer, with sufficient definition that the link can be created on another BSU. Likewise, at a target BSU, when the mobility protocol 802 sends a primitive to the mobility management entity 804 to create a link, the state of that link is contained in the primitive, and the mobility management entity sets the state in each protocol layer. Upon creation or clearing of a link, the mobility management entity 804 appropriately informs the link management support software 810 of this fact. Thus, "link context" is a generalized term to refer to the configuration status of all the layers abstracted by the mobility management entity 804, not just the Bluetooth link.

Whenever a new wireless link is first established, such as when a link is established under the Generic Access Profile ("GAP"), Part K:1, section 7, of the Bluetooth Profiles Protocol, the mobility management entity 804 sends a primitive informing of the existence of a new link to the mobility management entity 802.

The mobility management entity 804 also requests a unique address from the LMS software 810 to use in establishing and maintaining a link as the MU moves about the PMN.

The LMS software 810 provides services related to GAP, including providing a unique address for a BSU-to-BSU link, and a unique address for each BSU-to-MU link. For BSU-to-BSU links, the same address may be employed for all BSUs, such as during BSU synchronization. BSU synchronization is described in co-pending U.S. Patent Application entitled "Wireless Base Station to Base Station Synchronization in a Communication System, such as a System Employing a Short-Range Frequency Hopping Scheme," as noted below.

However, for BSU-to-MU links, a unique address must be established to provide for seamless handoff of MU context throughout the PMN. In one embodiment, the LMS software 810 performs functionality, through the mobility protocol 802, to request addresses from the system controller 208.

While the LMS software 810 may request such addresses when initially establishing a link, under an alternative embodiment, the LMS software may "prefetch" and store in the file 816 one or more virtual addresses before initiating links with MUs. As noted above, the LMS software 810 must be informed of not only the establishment or creation of links, but also when links are lost or cleared, to thereby notify this software when virtual addresses are used or not in use.

Further details regarding REMan 808 and REMon 814 include the following. REMan 808 supports mobility by providing the following functions: REMan obtains current records for existing links from the mobility manager; REMan obtains latest neighbor BSU identities from a neighbor discovery routine (further details regarding neighbor discovery are found in a co-pending U.S. patent application entitled Wireless Base Station Neighbor Discovery in a Communications System, Such as a System Employing a Short-Range Frequency Hopping Scheme, as noted herein); REMan obtains performance indicators for links it manages (as the owner BSU); REMan obtains performance indicators from REMan components of neighboring BSUs; and merges such indicators; likewise, REMan collects and forwards performance indicators for MUs when requested to do so by REMan components of neighboring BSUs. REMan 808 also evaluates performance indicators of each link it owns in order to do the following: use its own performance indicators and those collected from neighboring BSUs; make decisions on when to request performance indicators from neighboring BSUs; make handoff decisions based on such evaluations; provide one or more target BSUs for a handoff; inform the mobility manager of handoff requirements, and identify the target BSU; and supply an alternative target BSU information when requested to do so by the mobility manager.

REMon 814 receives a set of records from REMan 808 that indicate the MUs that REMon should monitor. Each record in the set identifies the MU to monitor (identified by its link context, which may be implicit or explicit), to perform its indicator types to be measured, and the timeslot the MU is to be monitored on. REMon 814 then sets an assigned RF controller (not shown) to receive using the link context for each MU at the assigned timeslots and measure the performance indicator specified in the record. REMon 814 then again associates the performance indicators with the particular MU or link context, and sends them back to REMan 808 for processing.

Further details regarding a process for determining and performing handoff are as follows.

1. REMan 808 collects performance indication data from its own radio and baseband monitoring functionality, as well as that from neighbor BSUs to determine when handoff is appropriate. Once a handoff for a mobile unit is determined, and a candidate-target BSU is selected, REMan first asks the candidate target REMan if it can accept the handoff by employing an appropriate request message e.g., "request_handoff," (which includes a mobile unit identifier "muID"). The muID is an 8 bit unique identifier (e.g., the lower or upper 8 bits of a channel identifier "CID") used for a mobile unit mainly to identify a mobile unit below the logical link control and adaption protocol ("L2CAP") under the Bluetooth protocol. The muID is a "handle" used by a BSU to refer to any information about an MU and its link to that particular BSU (including the virtual BD_ADDR or other unique session identifier). The muID on one BSU is unique to that BSU and meaningless to another BSU. When a handoff is done, the target BSU will assign a new muID handle to the collection of information about the MU and its link to the target BSU. The CID is used in L2CAP packets to identify which higher layer entity is using the channel under the Bluetooth Protocol. The CID value is also unique to each MU and its link to a BSU. The PMN uses a first part of the CID value to identify the BSU, and a second part to identify the MU.

2. Based on the current BSU congestion, the candidate-target REMan will accept or deny the request by responding with a message such as "request_handoff_result" (passing values muID, and either "accept_ho" or "deny_ho"). If accepted, the owner REMan proceeds with a handoff attempt to this target BSU; otherwise, the target REMan process asks each next candidate BSU if it can accept the handoff. If none accept, the REMan process discontinues the handoff attempt until the next monitoring cycle.

3. To proceed with a handoff, the owner REMan 808 sends an appropriate message to the Mobility Management Entity ("MME")process 804 (FIG. 8). An example of such a message may be "HoStopData" (passing the muID).

4. If the MME process 804 replies with appropriate link context data (a link context record as described herein), the owner REMan 808 sends the link context to the target REMan and commands the target REMan to add the handoff-link context to the target BSU. An example of such a command message may be "handoff_link_op" (where data passed includes the muID, a master Bluetooth device address uniquely identifying the link or session, the mobile unit Internet Protocol address ("muIPAddress") and any information in the mobile units link context record for the current communication link established with the mobile unit). The MU uses the virtual BD_ADDR as the master BD_ADDR in its link to any BSU. The MU always operates as if it is continuously connected to the same master, and uses this virtual BD_ADDR as part of that link context 5. The target REMan process 808 receives the result of the MU insertion from the target MME process 804. The result may be in the form of, for example, "HoStartDataResult" (with data such as the mobile unit ID and a success or failed value passed).

6. If all went well on the target side, the target REMan 808 will then add the MU to its monitoring database as an owned mobile unit to monitor.

7. The target REMan 808 informs the owner REMan of the success or failure of the link transfer. An example of such a success or failure message may be "handoff_link_op_result" (passing the mobile ID and a success or failure value). If the handoff was successful, the owner REMan 808 will change the status of the MU from owned to remote (assuming it will still be involved in monitoring). However, if the handoff failed, the owner REMan will attempt the handoff of the mobile unit to the next candidate BSU, and if none are available, REMan will abort the handoff and log any important events.

Further details regarding the MME process 804 will now be described. The MME process facilitates the deletion and addition of an upper stack Bluetooth link context during the mobile unit handoff process. The upper stack link context may be defined in one embodiment as all Bluetooth data, state, security and parametric information existing for a particular mobile unit link above the HCI layer, and below the IP layer.

The MME process 804 interfaces with other modules in the BSU or system controller. Referring back to FIG. 8, the MME process 804 interfaces with a "PPP" (point-to-point protocol) layer 820 (part of the TCP/IP protocol suite), and layers from the Bluetooth protocol stack: a SDP layer (not shown), an RFCOMM layer 824, an RFComm/PPP interface layer 822, an L2CAP layer 826, and an upper HCI layer 828. (The mobility process 806 interfaces with a lower HCI layer 830, an LMP layer 832, and a Baseband layer 834)., (These same layers are simply shown in FIGS. 8 for the neighbor BSU as "Protocol Layers".) However, the concept is extensible to include other layers as necessary as when other Bluetooth profiles are developed and used. These extensions will be obvious to those familiar with the technology and the techniques described herein. A primary responsibility of the MME process 804 is to get and set session context of the protocol layers (e.g., PPP, upper and lower layer Bluetooth stacks) when commanded to do so by REMan or other calling process. To do this, the MME process uses communication services ("CommServices") to start and stop IP data flow for a mobile unit. CommServices is a module through which BSU-to-BSU communications and BSU-to-system controller communications pass to obtain some level of communications reliability. All communications between any process in a BSU and an outside entity (another BSU or a system controller, for instance) goes through CommServices. (CommServices is represented in FIG. 8 as a communication path 836 between REMan 808 and the mobility protocol 802, and the path between mobility protocols of neighboring BSUs.) This getting and setting of session context and data is on a per mobile unit basis, and the MME process should handle multiple requests to perform this task in a first in/first out queue. The CommServices module is notified to start and stop transmission of IP data for a particular mobile unit based on messages from the MME process. Examples of such calls may be "BpStartMuData" and "BpStopMuData" (both passing the muID address). The IP address of the mobile unit is used as the primary identifier for CommServices.

Another interface module that the MME process employs is the mobility protocol 802, which commands the MME process to perform mobility management. This includes a first call for removing a mobile unit from one BSU ("RemoveMu"), and a second call for adding a mobile unit to another ("AddMu"). Mobility information is stack session context and buffer data for a particular mobile unit. Responses to both of these calls are sent when the MME process is finished. The MME process uses a queue to manage these calls since multiple requests for handoff need to be handled simultaneously. The notification that the above calls were successful will contain the mobile unit ID, the session or link context data, and the session or communication link data itself.

The MME process 804 interfaces with the PPP stack, which may be the WindNet PPP stack provided by Wind River, Inc. The MME process 804 also interfaces with the Bluetooth upper stack, which may be a Extended Systems, Inc stack, to get and set session contexts (L2CAP, RFCOMM, HCI and SDP). The MME process 804 may also use Link Management Services ("LMS") to add a mobile unit record to a mobile unit table. The mobile unit table uses the muID as the index, and includes master and slave Bluetooth addresses for the particular communication link, and the IP address of a mobile unit.

The MME process 804 may include a public interface that external modules, such as the mobility protocol 802, access. The interface, such as "MME_InsertMu," commands the MME process to set the link session context for an incoming mobile unit, set data buffers for the PPP, ESI and HCI stacks, and start the downward and upward flow of data to/from the mobile unit. The MME process will create a data buffer for the information to be stored during a handoff.

The MME process will deallocate the data buffer once the session and data for the various stacks have been set. Once the session context is set, the MME process will either perform a proxy under Address Resolution Protocol ("ARP"), as defined in IETF FRC826 (for a single subnet (or segment) architecture as in FIG. 2), or call a BP_MU_S-TART_DATA on the PSC 208 (for a multiple subnet (or segment) architecture as in FIG. 3), which will inform an IP mobility subsystem of the switch.

Figure 12:
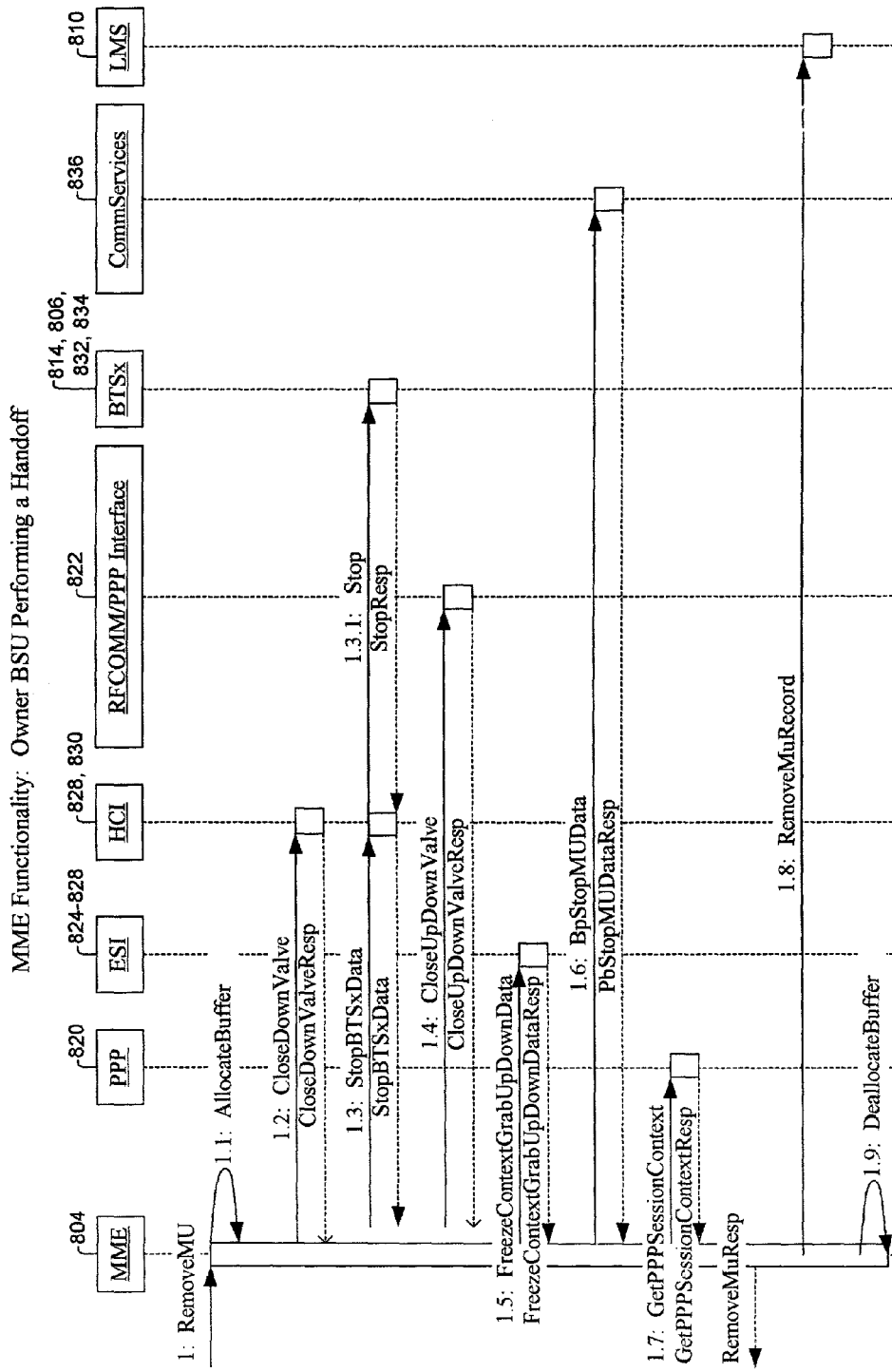
FIG. 12 is a sequence diagram showing functionality performed by and with a mobility management entity process by an owner BSU performing a handoff.

Performing a handoff is a primary function of the MME. The following discussion lists high-level steps involved in performing a handoff between owner and target BSUs. Steps involved in performing a handoff by an owner BSU are first described below, and refer to steps shown in the sequence diagram of FIG. 12; thereafter, steps performed by the target BSU are described with reference to FIG. 13. Note that the calls do not indicate any parameters which may be determined at implementation, depending upon particular protocol stacks employed. For most of these calls or messages, the MME process 804 will pass into them an identifier for the mobile unit and a pointer to a data structure that will contain the data asked for.

1. MME 804 receives a RemoveMu message from a caller process or device (e.g., from ReMan). MME will return a RemoveMuResp that will contain access to a data buffer. This data buffer will contain the session or link context and data of a mobile unit.

2. MME allocates a data buffer (e.g., using an "AllocateBuffer" command) that will contain the mobile unit session context and data.

3. MME calls the HCI layer's "CloseDownValve" method to shut down the connection at the HCI layer.

4. MME calls a "stopBTSxData" to the HCI layer, which then calls a "Stop" message to a base transceiver station (shown in FIG. 12 as "BTSx", which represents Bluetooth hardware and associated software that runs below the HCI in a BSU—components in FIG. 8 below the HCI). MME sends a command to the HCI layer (its transport interface) to remove the baseband link and get lower link context. The physical link to/from the MU is being removed and once it is removed, the system cannot communicate with the MU until the lower link context has been restored. This call results in a "Stop" call to the BTSx from the HCI Interface. The BTSx responds with a "StopResp" call and the HCI Interface calls a "stopBTSxDataResp" to the MME.

5. MME calls the "CloseUpDownValve" method on an appropriate interface, such as a "RFCOMM/PPP Interface", which shuts off data traffic going up and down the stack. The RFCOMM/PPP layer connects the Bluetooth stack (e.g., that provided by Extended Systems, Inc.("ESI")) to the TCP/IP stack through the PPP layer 820.

6. MME calls an interface "FreezeAndGrabUpDownContext", which freezes the Bluetooth stack, grabs session context, and then removes all session and up/down data. This interface is a modification to the Bluetooth stack required for handoff. FreezeAndGrabUpDownContext first freezes data for the mobile unit to preserve the state of the Bluetooth stack (i.e., stops the state of the stack from changing), and then removes the link context by copying it to the allocated data buffer and deletes the mobile unit's link context from the stack.

7. MME calls an interface "BpStopMUData," which stops data being sent to the mobile unit.

8. MME calls "GetPPPSessionContext", which gets the PPP stack session context from the PPP layer 820 and removes it.

9. MME returns the session context to REMan or other caller using a call "RemoveMuResp." The caller must acknowledge that it has received the buffer contents before MME can deallocate the buffer.

10. The caller copies the content of MME's data buffer and acknowledges MME with a response.

11. MME receives the acknowledgement and removes the mobile unit record from its table ("RemoveMuRecord") through LMS software 810 and the LMS file 816.

12. MME then deallocates the buffer ("DeallocateBuffer").

Figure 13:
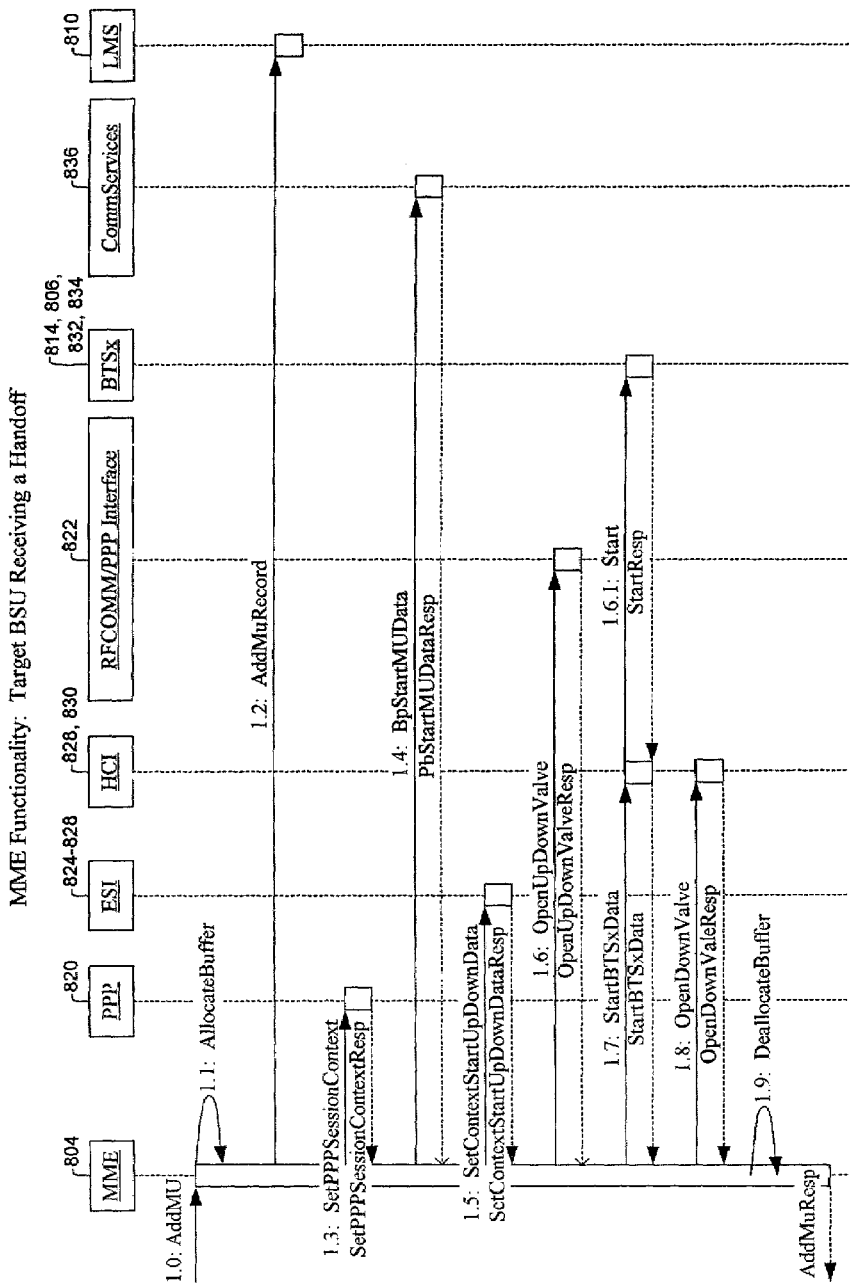
FIG. 13 is a sequence diagram showing functionality performed by and with a mobility management entity process by a target BSU performing a handoff.

As shown in FIG. 13, the process is similar on the target BSU for starting the data connection, but the order in which it is done is different.

1. An "AddMu" message is called on the target MME 804 by a caller, such as the target REMan. This message will create a mobile unit session context. For a handed-off mobile unit, it will include a data buffer full of session context and data.

2. MME allocates a buffer to copy the session context and data (using the "AllocateBuffer" call). MME also adds the mobile unit record to its table("AddMuRecord") through LMS software 810 and the LMS file 816.

3. MME calls "SetPPPSessionContext" from the PPP layer 820, which adds a mobile unit's session context and data to the PPP layer or stack.

4. MME calls "bpStartMUData" from CommServices 836. CommServices 836 starts IP data flow for the mobile unit. CommServices 836 responds that it has started IP data flow with a message "pbStartMUDataResp".

5. MME calls "SetContextStartUpDownData," which adds a session context, sets the session context, and adds up/down data to the Bluetooth stack. This is the complete session and data from the owner BSU's Bluetooth stack for the handed-off mobile unit.

6. MME calls "OpenUpDownValve," from the RFCOMM/PPP interface 822, which opens up the PPP and RFCOMM stacks 820 and 824 to upward and downward data flows.

7. MME calls "startBTSxData" to the HCI Interface layer and then to the BTSx. MME sends a command to the HCI transport interface to create a baseband link and set the lower link context, which adds the physical link to/from the MU. The target BSU now has the Bluetooth session context and the physical link.

8. MME calls the HCI Interface layer's "OpenDownValve" method, which opens the flow of upward and downward flowing data. The mobile unit's complete session context and data are now set in the various stacks and the data flow valves are open and ready for data traffic flow.

9. MME adds the mobile unit to its mobility table ("AddMuRecord").

10. MME deallocates the data buffer ("DeallocateBuffer").

11. MME sends a response back to the caller (owner REMan) to acknowledge that the transfer of the session context and data for the mobile unit was successful.

Specific parameters passed are not addressed here because they are particular to a given implementation. MME passes a mobile unit identifier (e.g., a virtual BD_ADDR) and a pointer to a data buffer that contains the link context information.

Figure 14:
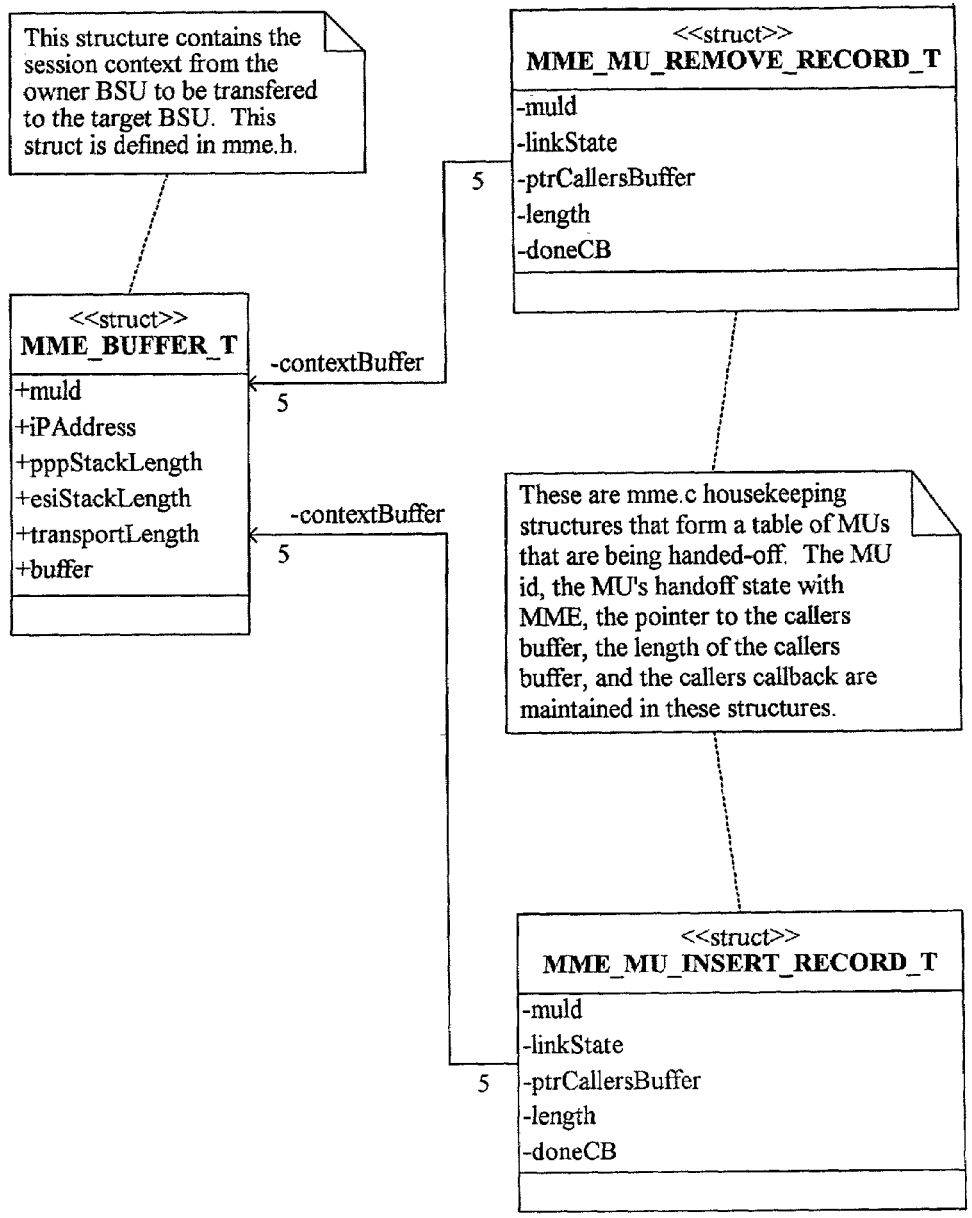
FIG. 14 is a block diagram illustrating data structures employed by the mobility management entity process.

Referring to FIG. 14, an example of data structures employed by MME 804 are shown. As shown, MME may employ data structures implemented in C ("mme.c"). Two tables may be provided to identify MUs being handed off (either handed off to a neighboring BSU, or being handed off from a neighboring BSU). Each record includes information shown, such as the mobile unit ID (muID), the mobile unit's handoff state with MME ("linkState"), a pointer to the layer or process buffering data that defines the link context ("ptrCallersBuffer"), a length of the caller's buffer ("length"), and the caller's callback address or process ("doneCB").

A "MME_buffer_t" data structure contains session context from the owner BSU to be transferred to the target BSU, which is also defined in C code (as "mme.h"). This data structure includes the mobile unit ID (muID), "IpAddress" (the IP address of the mobile unit), "pppStackLength" (the size of the PPP link context) "esiStackLength" (the size of the Bluetooth upper and lower link context) "transportLength" (the size of the transport layer link context), and "buffer" (the link context of the PPP, Bluetooth upper and lower layers, and transport layer).

To implement aspects of link context mobility effectively, some parameters should be considered. These parameters include those that allow an MU to operate as if any BSU is the same as any other, so long as those BSUs support the correct link context. Many parameters are Bluetooth specific.

Referring to FIG. 10, an example of a link context record 1000 as stored in the LMS file 816, and which is transferred during a hand off, is shown. A virtual Bluetooth device address or other unique address field 1002 is that unique address assigned to a link when initially established, and which is transferred between BSUs during hand off, as described herein. As explained herein, the address may be generated in various ways, but under at least some embodiments, is a unique Bluetooth device address used to distinguish one link with an MU from other links currently established in the PMN. Addresses may be reused, but must be unique with respect to at least neighboring BSUs so that no conflict or confusion would arise between two links.

A BSU system clock offset ("CLK_OFFSET") is an offset value associated with a system clock CLK. Alternatively, or additionally, the record 1000 may include the current system clock value of the BSU ("CLK"). The system clock, or CLK, is one parameter used by the BSU and the MU to determine the time variant transmission frequency that they will communicate over at any particular time.

For one BSU to assume the link context from another BSU, it must be able to synchronize its clock. A method for synchronizing these clocks for all BSUs in a PMN is described in the Wireless Base Station Synchronization U.S. patent application described herein.

An Active Member Address field 1006 is a value chosen from the range 1 through 7. Its main purpose is so MUs (operating in slave mode) can differentiate between transmissions from their BSU (operating in master mode) meant for them or for other MUs.

Under the Bluetooth protocol, standard communications between an MU and a BSU are selectively processed based on transmission frequency, Active Member Address, and the Bluetooth Device Address of the BSU. If the original BSU were to establish a link with another MU, that link context must not have the same link context as any other links that were transferred to nearby BSUs. If one BSU were to transfer these three parameters, as part of the link context, to another nearby BSU, it might be possible that MUs linked to adjacent BSUs could share the same parameter values as part of their link contexts. An MU might thereby "crossconnect" with the wrong BSU, and vice versa, because of the close proximity of these devices. Thus, in at least some embodiments, a unique Bluetooth device address is used to distinguish between links. As explained below, other information exchanged between BSUs may be used to uniquely define links.

The link context record 1000 may include additional fields. For example, if encryption is employed, then a encryption keys field 1008 may be used. The BSUs IP address may be reflected in a BSU IP address field 1010. Any agreed upon modes and timing parameters associated with these modes (such as Sniff, Hold or Park modes) are reflected in a field 1012. The mobile unit's ID (a unique Bluetooth device address) is reflected in a field 1014. A channel ID (a 16 bit value) is stored in a channel ID field 1016. The record 1000 may further include a link initialization time field 1018 that reflects when a link with a mobile was first established.

Further details regarding data structures for link context are as follows. Regarding upper stack link context data structures, various parameters, values or variables are exported and imported when forwarding a mobile unit. Specific data structures and their parameters are often specific to a particular protocol stack employed. Examples of some groups of data structure elements for the upper stack protocol include the following: fields used internally by the specific protocol stack, fields used for security, fields used internally by L2CAP, fields used internally by a service discovery protocol (SDP) client and server (under the Bluetooth protocol), incoming connection fields, access mode and current settings fields, local radio settings, HCI connections cable and state fields, dynamic broadcast handles, etc.

Regarding lower stack link context data structures, various parameters, values or variables are exported and imported when forwarding a mobile unit.

Specific data structures and their parameters are often specific to a particular protocol stack employed. Examples of some groups of data structure elements for the lower protocol stack include the following: fields used internally by the specific protocol stack, fields used for security, fields used internally by a Link Manager Protocol ("LMP"), and some fields used internally by a Baseband Controller.

Some Alternative Embodiments

Various alternative methods for generating unique link context to facilitate mobility within the PMN are possible. In general, the following alternatives are substantially similar to those described above. Only significant differences in construction or operation are described in detail.

Under one alternative embodiment, a central server or the system controller 208 does not employ DHCP or IP addresses for establishing the virtual BD_ADDR for a link, but instead the system controller under block 706 (of FIG. 7) provides unique Bluetooth Device Addresses on request, from a set or pool of addresses within a block assigned to a manufacturer. As addresses are assigned to links upon the request of BSUs, the server will withhold providing those same addresses for reuse. As links are released, their addresses are returned from the BSU to the server, whereupon they become reusable.

An alternative method allows for a more distributed PMN environment, where the BSUs cooperate in allowing an individual BSU to create an address, with or without the help of the system controller. In this method, any BSU that needs an address can randomly generate one that falls within the assigned block. It then queries all of the other BSUs in the PMN to see if that address is in use as part of an existing link context. Each BSU maintains a record of the link contexts for the links associated with them, and thereby has a record of the Bluetooth Device Addresses that are part of those contexts. If no response is heard from any BSU within a specified amount of time, it is assumed that the Address is unique within the PMN, it not being assigned to any link context, and it can be assigned to a new link.

Figure 11:
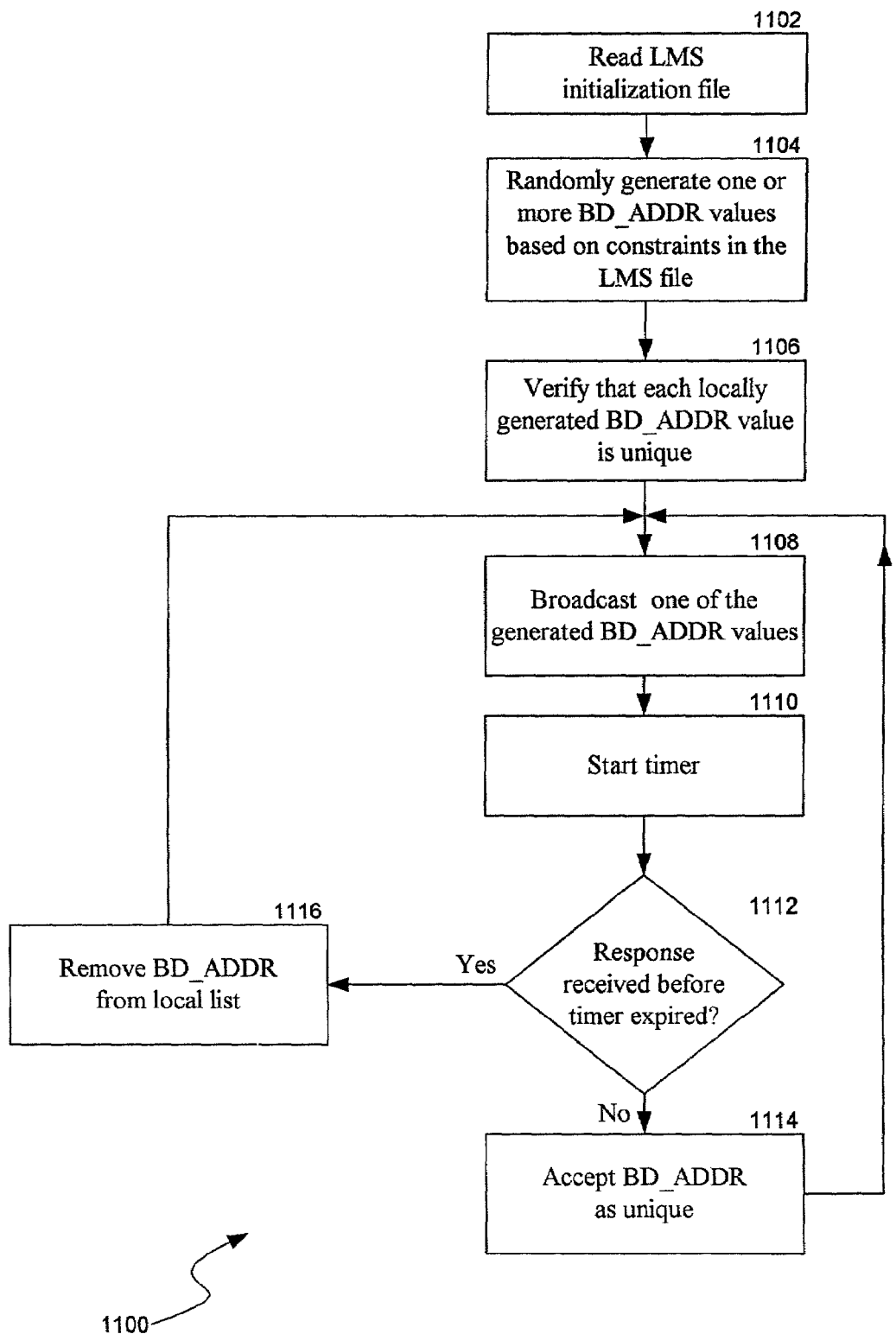
FIG. 11 is a flow diagram illustrating an alternative embodiment for uniquely generating addresses for link context.

Referring to FIG. 11, a routine 1100 depicts this alternative. Beginning in block 1102, a BSU reads the LMS initialization file 816 to determine any constraints in configurations required for links. For example, the BSU may read a range of Bluetooth addresses to determine whether generated addresses fall within an acceptable range. In block 1104, the BSU randomly generates one or more Bluetooth device address values based on constraints in the LMS file 816. In block 1106, the BSU verifies that each address generated is unique with respect to each other locally generated address.

In block 1108, the BSU broadcasts one of the generated address values, and in block 1110 starts a timer. The timer value may be some default value, or a value retrieved from the initialization file 816. In block 1112, the BSU determines whether any responses have been received before the timer expires. If not, then the BSU in block 1114 determines that the generated address is unique, and the routine loops back to again perform the functions under block 1108, 1110 and 1112 with another of the locally generated addresses. All of the remaining addresses are then stored in the LMS file 816 for use when an MU requests to establish a link.

If a response is received, indicating that another BSU has generated such an address, then in block 1116, the BSU removes that address from the list. Each BSU in the PMN, during address selection and initialization, cooperates with each other by listening for broadcasts from other BSUs. An asynchronous process in the LMS software 810 listens for such requests by neighboring BSUs, and for each request, compares a received address with locally generated addresses that have previously been generated and verified (under block 1114) to determine whether to send a response.

Each BSU (or the system controller) may generate unique addresses using algorithms that have a high probability of being unique. An example of such an algorithm is the Message Digest algorithms that may be adapted to generate 48 bit unique address or BD_ADDR values, based on a function of the MU BD_ADDR and the read BSU BD_ADDR.

Link context mobility generally requires that every link context must be unique within a network or portion thereof. The method described above for allocating unique Bluetooth Device Address values can be extended to create unique link contexts by allocating other parameters that are part of the link context. This way, the actual parameters used to generate the unique link context, such as active member address and/or clock timing, can be determined based on other factors (such as performance tradeoffs with the equipment used in the PMN).

Under another alternative embodiment, the Active Member Address may alone be used to provide link context mobility. However, the current Bluetooth protocol permits only seven active member address values. Thus, this constrains the number of links that may be established and be unique within the PMN. Such an alternative may be possible with a small number of MUs. Under this embodiment, each BSU chooses new active member addresses in consecutive order, only repeating after all values have been used previously, i.e., 1, 2, 3, 4, 5, 6, 7, 1, 2 . . . .

Under another alternative embodiment, locally unique virtual Bluetooth device addresses are not employed as the distinguishing, unique feature identifying links. Instead, clock timing is employed where, a different clock offset value can be assigned to each link context. The clock value, CLK, is a multi-bit word. The offset can be any value added to that, and thereby provide a way to make a link context unique. This requires that the clock frequency of CLKN, or native clock, of all BSUs be precisely synchronized, and a method for doing this is described in the Wireless Base Station Synchronization application noted herein.

Every Bluetooth device employs a 28-bit system clock that is normally operating from a native clock source, CLKN, that is not synchronized to any other Bluetooth device. Bluetooth masters add an offset to the value of the CLKN to obtain the clock value used to communicate with a slave. In one embodiment, each BSU within a PMN, acting as a master, has its CLK synchronized with every other BSU in the PMN, such as by operating from a common, distributed frequency source, and by setting its clock offset value so that when the offset is added to the value of CLKN, they all have the same CLK value.

Distributing a frequency source to all BSUs can be accomplished across the physical wiring or other communication media that provides the network interconnections between the BSUs. One embodiment of the PMN and BSU interconnection would use 10/100 Base-T Ethernet over Category 5 wiring. That wiring may provide undedicated wires that can be used to distribute a frequency source, but other means to share existing wires could be employed as well.

Frequency synchronization is not necessarily adequate. The values of CLK should also be synchronized, which requires the distribution of a global time value. This can be supported to some degree, using NTP, or Network Time Protocol, over the network that connects the BSUs. NTP is a protocol running over TCP/IP (port 123) that is designed to synchronize clocks on servers. Clients receive time data from an NTP server and can adjust their clocks as necessary.

The precision that NTP can provide may be inadequate at about 1 millisecond, where mobility may require 1 microsecond precision. To achieve 1 microsecond precision, the frequency source referred to above may be augmented with a global time distribution, and various ways to do this are considered standard practice (such as distributing synchronized periodic waveforms). A combination of frequency/time distribution on the network, plus NTP, may be considered more efficient than frequency/time distribution alone.

In practice, when an MU requests to establish a link with a BSU, the BSU in block 706 (FIG. 7) generates a unique clock offset (as opposed to a unique address). This clock offset then is stored in the clock offset field 1004 of the link context record 1000. This link context record and associated clock offset field, stored in the LMS file 816, is transferred to a target or neighbor BSU during hand off.

While BSUs are generally described herein, aspects of the invention may employ any "Bluetooth switch" or network communication device. Such a network communication device may have less functionality and be cheaper to implement than a BSU. Aspects of the invention apply to nodes in a network, such as network access points, stationary nodes in a picocellular communications network, peer-to-peer stationary network access points, and the like. A picocellular system node typically refers to a wireless base station with extremely low power designed to cover an extremely small area, such as one floor of an office building. Indeed, short range wireless communication, as described herein, generally refers to an effective range of 500 meters or less (and with Bluetooth, often less than 100 meters), although some systems may reach up to 1 kilometer depending upon the wireless transmission protocol. Base station units described herein are generally fixed relative to a given location. The location may be any stationary building or geographic space (such as a parking lot or park). Alternatively, the BSU may be fixed relative to a movable object such as a vehicle (e.g., a train or plane).

Much of the software described above is described as being implemented in each BSU, some or all of the software components could be configured to run on a remote processor, and communicate with a thin client that runs each BSU.

In general, methods for generating addresses (or other unique link defining data) and performing link context mobility with handing off of links between BSUs is done at a peer-to-peer level, without involvement of the MU. Thus, mobile units or other Bluetooth enabled devices using the PMN need not be specially configured to permit roaming within the PMN.

Overall, several beneficial consequences exist in transferring the link context from BSU to BSU, including the following.

1. The communication between the MU and the network can continue without even a temporary interruption of service.

2. The MU need not be modified, or behave in a modified way, from what is specified in the Bluetooth protocol version 1.0B and subsequent specifications.

3. The time required for an MU to establish a link with a BSU is reduced when the link context is transferred from another BSU. Bluetooth normally requires inquiry and paging, which can consume time on the order of 1 to 2 seconds or more, before a link can be established.

4. A BSU can assume a unique identity for each link context and associated MU. By doing so, the BSU can actively communicate with considerably more than seven devices at one time without resorting to cumbersome Bluetooth processes, which include putting MUs in park mode. The Bluetooth specification only allows a device that is a "Master" to maintain seven active links, which is an overly strict limitation of the protocol.

Those skilled in the relevant art will appreciate that the invention can be practiced with various telecommunications or computer system configurations, including Internet appliances, hand-held devices, wearable computers, palm-top computers, cellular or mobile phones, multiprocessor systems, microprocessor-based or programmable consumer electronics, set-top boxes, network PCs, minicomputers, mainframe computers, and the like. Aspects of the invention can be embodied in a special purpose computer or data processor that is specifically programmed, configured or constructed to perform one or more of the computer-executable instructions explained in detail herein. Indeed, the term "computer," as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Incorporated by reference herein are all above references, patents or applications and the following U.S. applications, which are assigned to the assignee of this application: application Ser. No. 10,706,788, entitled "Wireless Base Station Neighbor Discovery in a Communication System, such as a System Employing a Short-Range Frequency Hopping Scheme"; application Ser No. 60,333,885, entitled "Wireless Base Station to Base Station Synchronization in a Communication System, such as a System Employing a Short-Range Frequency Hopping Scheme"; application Ser. No. 60/288,270, entitled "Method for Load Balancing Wireless Networks"; application Ser. No. 60/288,301, entitled "Frequency-Hopping Spread Spectrum Wireless Systems Interface Migration by Transmit Suppression"; and application Ser. No. 60/288,300, entitled "Visual Base Station to Wireless Link Quality Indicator"; and application Ser. No. 60/311,716, entitled "Virtual Bluetooth Devices as a Means of Extending Pairing and Bonding in a Bluetooth Network".

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the PMN system described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for wirelessly exchanging communications with at least one mobile unit, the system comprising:
    a first base station unit coupled to a network;
    a second base station unit coupled to the network, wherein the first and second base station units are configured to communicate wirelessly with the mobile unit under a Bluetooth protocol;
    wherein the first and second base station units are further configured for:
        at the first base station unit, receiving a communication from the mobile unit;
        at the first base station unit, requesting a unique session address for the mobile unit, wherein the unique address is associated with a unique Bluetooth Device Address ("BD_ADDR");
        at the first base station unit, establishing a communications link with the mobile unit, wherein the communications link includes link context data associated with the mobile unit, and wherein the link context data associated with the mobile unit is identified at least in part based on the unique address;
        determining that the mobile unit is to be handed-off to the second base station unit;
        at the first base station unit, handing off to the second base station unit the communications link and link context associated with the mobile unit;
    a system controller coupled to the first and second base station units and to the network, wherein the system controller includes a Dynamic Host Configuration Protocol ("DHCP") server, wherein requesting a unique session address includes:
        at the system controller, receiving the request,
        generating a locally unique Internet Protocol ("IP") address via the DHCP server,
        mapping the generated IP address to the unique BD_ADDR, wherein the unique BD_ADDR is a six byte value, and wherein mapping includes generating a lower three bytes of the six bytes of the unique BD_ADDR based on the generated IP address, and
        forwarding to the first base station unit the unique BD_ADDR;
    wherein the first and second base station units include:
        upper and lower Bluetooth protocol stacks,
        a mobility protocol to perform generic mobility link establishing and link clearing,
            wherein the mobility protocol is configured to operate above a Host Controller Interface ("HCI") under the Bluetooth protocol,
        a mobility management entity, configured to operate above the HCI, for providing a protocol independent interface between the mobility protocol and the upper layers of the Bluetooth protocol stack, wherein the upper layers operate above the HCI, and
        a mobility process, configured to operate below the HCI, for interfacing between the mobility management entity and the lower layers of the Bluetooth protocol stack, wherein the lower layers operate below the HCI;
    wherein the second base station is configured to determine that the communication link with the mobile unit is lost or cleared and provide a message to the system controller, and wherein the system controller releases the unique BD_ADDR in response to the received message.

2. A system for wirelessly exchanging communications with at least one mobile unit, the system comprising:
    a first base station unit coupled to a network;
    a second base station unit coupled to the network, wherein the first and second base station units are configured to communicate wirelessly with the mobile unit under a Bluetooth protocol;
    wherein the first and second base station units are further configured for:
        at the first base station unit, receiving a communication from the mobile unit;

at the first base station unit, requesting a unique session address for the mobile unit, wherein the unique address is associated with a unique Bluetooth Device Address ("BD_ADDR");

at the first base station unit, establishing a communications link with the mobile unit, wherein the communications link includes link context data associated with the mobile unit, and wherein the link context data associated with the mobile unit is identified at least in part based on the unique address;

determining that the mobile unit is to be handed-off to the second base station unit;

at the first base station unit, handing off to the second base station unit the communications link and link context associated with the mobile unit;

a system controller coupled to the first and second base station units and to the network, wherein the first and second base station units include a radio environment management entity and a mobility protocol, and wherein at least the first base station unit is further configured for:

monitoring a quality of the communications link with mobile unit;

at the radio environment management entity, determining that the quality of the communications link has dropped below a threshold and generating a handoff request message;

at the mobility protocol, receiving the handoff request message, sending a suspend message to the system controller to suspend transmissions for the mobile unit, and sending a handoff acceptance inquiry message to the mobility protocol of the second base station unit;

receiving a response from the second base station unit;

forwarding the link context data to the second base station unit exchanging primitives between the mobility protocol and the mobility management entity to clear the communications link at the first base station unit;

at the mobility protocol, sending a link cleared message to the radio environment management entity; and at the mobility protocol, sending a resume data transmissions message to the system controller, wherein, in response thereto, the system controller sends data for the mobile unit to the second base station unit.

3. In a network, a method for wirelessly exchanging communications with at least one mobile unit, wherein the network includes first and second base station units coupled to the network, the method comprising:

at the first base station unit, receiving a wireless communication from the mobile unit, wherein the wireless communication is under a wireless communications protocol, wherein the wireless communications protocol. does not provide for handoff of communications links between base station units;

at the first base station unit, obtaining a unique session identifier for the communication with the mobile unit;

at the first base station unit, establishing a communications link with the mobile unit, wherein the communications link includes link context data associated with the mobile unit, and wherein the link context data associated with the mobile unit is identified at least in part based on the unique session identifier;

determining that the mobile unit is to be handed-off to the second base station unit;

handing off to the second base station unit the communications link and link context associated with the mobile unit, wherein the handing off is performed without assistance of the mobile unit; and wherein the unique session identifier is a virtual Bluetooth device address having a six byte value, and wherein a lower three bytes of the six bytes of the unique BD_ADDR are generated by the first base station unit of the network and the three bytes fall within a range that is less than a total range available under the three bytes.

4. The method of claim 3 wherein the first and second base station units are both Bluetooth enabled base station units that employ upper and lower Bluetooth protocol stacks, wherein the unique session identifier is a unique Bluetooth Device Address ("BD_ADDR"), and wherein the first and second base station units include:

a mobility protocol to perform generic mobility link establishing and link clearing, wherein the mobility protocol is configured to operate above a Host Controller Interface ("HCI") under the Bluetooth protocol, a mobility management entity, configured to operate above the HCI, for providing a protocol independent interface between the mobility protocol and the upper layers of the Bluetooth protocol stack, wherein the upper layers operate above the HCI, and a mobility process, configured to operate below the HCI, for interfacing between the mobility management entity and the lower layers of the Bluetooth protocol stack, wherein the lower layers operate below the HCI.

5. The method of claim 3 wherein receiving a wireless communication from the mobile unit includes receiving communication signals under a Bluetooth protocol from the mobile unit.

6. The method of claim 3 wherein the unique session identifier is a virtual Bluetooth device address.

7. The method of claim 3, further comprising a system controller coupled to the first and second base station units and to the network, wherein the system controller includes a Dynamic Host Configuration Protocol ("DHCP") server, and wherein obtaining a unique session identifier includes:

at the system controller, receiving a request from the first base station unit, generating a locally unique Internet Protocol ("IP") address via the DHCP server, mapping the generated IP address to a unique BD_ADDR, wherein the unique BD_ADDR is a six byte value, and wherein mapping includes generating a lower three bytes of the six bytes of the unique BD_ADDR based on the generated IP address, and forwarding to the first base station unit the unique BD_ADDR.

8. The method of claim 3 wherein the first base station unit or the network includes a Dynamic Host Configuration Protocol ("DHCP") function, and wherein obtaining a unique session identifier includes:

generating a locally unique Internet Protocol ("IP") address via the DHCP function, and mapping the generated IP address to the unique session identifier.

9. In a network, a method for wirelessly exchanging communications with at least one mobile unit, wherein the network includes first and second base stations units coupled to the network, the method comprising:

at the first base station unit, receiving a wireless communication from the mobile unit, wherein the wireless communication is under a wireless communications protocol, wherein the wireless communications protocol does not provide for handoff of communications links between base station units;

at the first base station unit, obtaining a unique session identifier for the communication with the mobile unit;

at the first base station unit, establishing a communications link with the mobile unit, wherein the communications link includes link context data associated with the mobile unit, and wherein the link context data associated with the mobile unit is identified at least in part based on the unique session identifier;

determining that the mobile unit is to be handed-off to the second base station unit handing off to the second base station unit the communications link and link context associated with the mobile unit, wherein the handing off is performed without assistance of the mobile unit; and a system controller coupled to the first and second base station units and to the network, wherein the second base station is configured to determine that the communication link with the mobile unit is lost or cleared and provide a message to the system controller, and wherein the system controller releases the unique session identifier for future use in response to the received message.

10. The method of claim 9, further comprising generating a set of unique session identifiers before receiving the wireless communication from the mobile unit or other mobile units, wherein generating comprises:

at each base station unit in the network, locally generating at least one proposed identifier value;

transmitting the proposed value to base station units in the network;

determining whether any other base station units have generated an identical identifier value; and if not, then storing the proposed value for use as the unique session identifier.

11. The method of claim 9, further comprising a system controller coupled to the first and second base station units and to the network, and wherein determining that the mobile unit is to be handed-off and handing off to the second base station unit includes:

monitoring a quality of the communications link with mobile unit;

determining that the quality of the communications link has dropped below a threshold;

sending a suspend message to the system controller to suspend transmissions for the mobile unit, and sending a handoff acceptance inquiry message to the second base station unit;

receiving a response from the second base station unit;

forwarding the link context data to the second base station unit;

clearing the communications link at the first base station unit; and sending a resume data transmissions message to the system controller, wherein, in response thereto, the system controller sends data for the mobile unit to the second base station unit.

12. The method of claim 9 wherein determining that the mobile unit is to be handed-off and handing off to the second base station unit includes:

determining that a quality of the communications link has dropped below a threshold;

sending a handoff acceptance inquiry message to the second base station unit;

receiving a response from the second base station unit;

forwarding the link context data to the second base station unit; and clearing the communications link at the first base station unit.

13. The method of claim 9 wherein the first and second base station units are stationary relative to a moving vehicle.

14. The method of claim 9 wherein the first and second base station units are stationary.

15. The method of claim 9 wherein the unique session identifier is a active member address value selected under the Bluetooth protocol.

16. The method of claim 9 wherein the unique session identifier is a selected clock offset value from a synchronized native clock value CLKN employed by the first and second base station units.

17. The method of claim 9 further comprising synchronizing a clock of the first base station unit with a clock of the second base station unit.

18. In a picocellular communications network, wherein at least one mobile unit communicates with at least a portion of the network, an apparatus comprising:

a stationary wireless network access point coupled to the picocellular communications network, wherein the access point includes a memory and is configured for:

receiving a wireless communication from the mobile unit, wherein the wireless communication is under a wireless communications protocol, and wherein the wireless communications protocol does not provide for handoff of communications links between stationary wireless network access points in the picocellular communications network;

obtaining a unique session identifier for the communication with the mobile unit;

establishing a communications link with the mobile unit, wherein the communications link includes link context data associated with the mobile unit, and wherein the link context data associated with the mobile unit is identified at least in part based on the unique session identifier;

determining that the mobile unit is to be handed-off to a neighboring stationary wireless network access point;

handing off to the neighboring stationary wireless network access point the communications link and link context associated with the mobile unit, wherein the handing off is performed without assistance of the mobile unit; and wherein the link context data includes values under upper Bluetooth protocol or Internet Protocol layers above a Host Controller Interface ("HCI"), and at least one lower Bluetooth protocol layers below the HCI.

19. The apparatus of claim 18 wherein the network access point or the picocellular communications network includes a Dynamic Host Configuration Protocol ("DHCP") function, and wherein obtaining a unique session identifier includes:

generating a locally unique Internet Protocol ("IP") address via the DHCP function, and mapping the generated IP address to the unique session identifier.

20. The apparatus of claim 18 wherein the network access point is further configured for generating a set of unique session identifiers before receiving the wireless communication from the mobile unit, wherein generating comprises:

locally generating at least one proposed identifier value;

transmitting the proposed value to other network access points in the picocellular communications network;

determining whether any other network access points have generated an identical identifier value; and if not, then storing in the memory the proposed value for use as the unique session identifier.

21. The apparatus of claim 18 wherein the network access point is stationary relative to a moving vehicle.

22. The apparatus of claim 18 the unique session identifier is a active member address value selected under the Bluetooth protocol.

23. The apparatus of claim 18 wherein the unique session identifier is a selected clock offset value from a synchronized native clock value CLKN employed by the first and second access points.

24. The apparatus of claim 18 wherein the network access point has a clock and is configured to synchronize with a clock of the neighboring stationary wireless network access point.

25. In a picocellular communications network, wherein at least one mobile unit communicates with at least a portion of the network, an apparatus comprising:
   a stationary wireless network access point coupled to the picocellular communications network, wherein the access point includes a memory and is configured for:
      receiving a wireless communication from the mobile unit, wherein the wireless communication is under a wireless communications protocol, and wherein the wireless communications protocol does not provide for handoff of communications links between stationary wireless network access points in the picocellular communications network;
      obtaining a unique session identifier for the communication with the mobile unit;
      establishing a communications link with the mobile unit, wherein the communications link includes link context data associated with the mobile unit, and wherein the link context data associated with the mobile unit is identified at least in part based on the unique session identifier;
      determining that the mobile unit is to be handed-off to a neighboring stationary wireless network access point;
      handing off to the neighboring stationary wireless network access point the communications link and link context associated with the mobile unit, wherein the handing off is performed without assistance of the mobile unit;
   a system controller coupled to the network access point;
   a gateway router coupled to the system controller and the network access point, wherein the network access point forms at least a part of a first subnet;
   a backbone router coupled to the gateway router and to the neighboring network access point, wherein the neighboring network access point forms at least a part of a second subnet; and
   a point of presence coupled to the backbone router, wherein the point of presence and the mobile unit form at least part of a mobile unit virtual subnet.

26. In a picocellular communications network, wherein at least one mobile unit communicates with at least a portion of the network, an apparatus comprising:
   a stationary wireless network access point coupled to the picocellular communications network, wherein the access point includes a memory and is configured for:
      receiving a wireless communication from the mobile unit, wherein the wireless communication is under a wireless communications protocol, and wherein the wireless communications protocol does not provide for handoff of communications links between stationary wireless network access points in the picocellular communications network;
      obtaining a unique session identifier for the communication with the mobile unit;
      establishing a communications link with the mobile unit, wherein the communications link includes link context data associated with the mobile unit, and wherein the link context data associated with the mobile unit is identified at least in part based on the unique session identifier;
      determining that the mobile unit is to be handed-off to a neighboring stationary wireless network access point;
      handing off to the neighboring stationary wireless network access point the communications link and link context associated with the mobile unit, wherein the handing off is performed without assistance of the mobile unit; and
   wherein the unique session identifier is a virtual Bluetooth device address.

27. In a picocellular communications network, wherein at least one mobile unit communicates with at least a portion of the network, an apparatus comprising:
   a stationary wireless network access point coupled to the picocellular communications network, wherein the access point includes a memory and is configured for:
      receiving a wireless communication from the mobile unit, wherein the wireless communication is under a wireless communications protocol, and wherein the wireless communications protocol does not provide for handoff of communications links between stationary wireless network access points in the picocellular communications network;
      obtaining a unique session identifier for the communication with the mobile unit;
      establishing a communications link with the mobile unit, wherein the communications link includes link context data associated with the mobile unit, and wherein the link context data associated with the mobile unit is identified at least in part based on the unique session identifier;
      determining that the mobile unit is to be handed-off to a neighboring stationary wireless network access point;
      handing off to the neighboring stationary wireless network access point the communications link and link context associated with the mobile unit, wherein the handing off is performed without assistance of the mobile unit; and
   wherein the network access point is configured to generate a first unique mobile unit ID that is associated with the session identifier, and wherein the neighboring stationary wireless network access point is configured to generate a second unique mobile unit ID that differs the first mobile unit ID, but is likewise associated with the session identifier.

* * * * *

UNITED STATES PATENT AND TRADEMARK OFFICE
CERTIFICATE OF CORRECTION

| | |
|---|---|
| PATENT NO. | : 7,016,325 B2 |
| DATED | : March 21, 2006 |
| INVENTOR(S) | : James Beasley et al. |

It is certified that error appears in the above-identified patent and that said Letters Patent is hereby corrected as shown below:

<u>Title page,</u>
Item [75], Inventors, "Matthew Kuiken, Thousand Oaks, CA (US);" should be
-- Matthew Kuiken, Goleta, CA (US). --.

Signed and Sealed this

Twenty-third Day of May, 2006

JON W. DUDAS
*Director of the United States Patent and Trademark Office*